US012274346B2

(12) United States Patent
Brown et al.

(10) Patent No.: US 12,274,346 B2
(45) Date of Patent: Apr. 15, 2025

(54) SYSTEMS AND METHODS FOR COLORING HAIR

(71) Applicant: CLICS, LLC, La Jolla, CA (US)

(72) Inventors: Charles D. Brown, San Diego, CA (US); Leilani M. Macedo, La Jolla, CA (US); Heidi L. Buck, San Diego, CA (US); Jeffrey S. Ploetner, San Diego, CA (US); Eric C. Hallenborg, La Mesa, CA (US); Stuart D'Alessandro, La Jolla, CA (US); Wildon Zissel, Reno, NV (US)

(73) Assignee: CLICS LLC, San Diego, CA (US)

(*) Notice: Subject to any disclaimer, the term of this patent is extended or adjusted under 35 U.S.C. 154(b) by 558 days.

(21) Appl. No.: 17/611,103

(22) PCT Filed: May 14, 2020

(86) PCT No.: PCT/US2020/032981
§ 371 (c)(1),
(2) Date: Nov. 12, 2021

(87) PCT Pub. No.: WO2020/232300
PCT Pub. Date: Nov. 19, 2020

(65) Prior Publication Data

US 2022/0225747 A1 Jul. 21, 2022

Related U.S. Application Data

(60) Provisional application No. 62/848,471, filed on May 15, 2019.

(51) Int. Cl.
*A45D 34/04* (2006.01)
*A45D 19/00* (2006.01)
(Continued)

(52) U.S. Cl.
CPC ............ *A45D 34/04* (2013.01); *A45D 19/00* (2013.01); *A45D 40/24* (2013.01); *B01F 33/841* (2022.01);
(Continued)

(58) Field of Classification Search
CPC .. A45D 19/00; A45D 2044/007; B01F 33/844
(Continued)

(56) References Cited

U.S. PATENT DOCUMENTS 7,963,303 B2 6/2011 Saranow et al.
8,336,582 B2 12/2012 Saranow
(Continued)

FOREIGN PATENT DOCUMENTS

JP H 3-158072 A 11/1998
JP 2014-510099 A 4/2014
(Continued)

OTHER PUBLICATIONS

Extended European Search Report, dated Dec. 15, 2022, issued in European Patent Application No. 20805143.3.
(Continued)

*Primary Examiner* — Ricky Go
(74) *Attorney, Agent, or Firm* — Knobbe, Martens, Olson & Bear, LLP

(57) ABSTRACT

A system for scanning a client's hair color and dispensing hair coloring to change the clients hair color from an initial color to a target color is disclosed. The system comprises an input for reading the measured color from the scanning device, a processor configured to compare the measured color to a desired target hair color and develop a coloring protocol for changing the clients current hair color to the desired target color, and a dispenser for dispensing one or more formulations that follow the protocol.

25 Claims, 32 Drawing Sheets

(51) Int. Cl.

| | |
|---|---|
| ***A45D 40/24*** | (2006.01) |
| ***B01F 33/84*** | (2022.01) |
| ***B01F 33/841*** | (2022.01) |
| *A45D 44/00* | (2006.01) |
| *B01F 101/30* | (2022.01) |

(52) U.S. Cl.
CPC ...... *B01F 33/844* (2022.01); *A45D 2044/007* (2013.01); *A45D 2200/058* (2013.01); *B01F 2101/30* (2022.01)

(58) Field of Classification Search
USPC .......................................................... 702/189
See application file for complete search history.

(56) References Cited

U.S. PATENT DOCUMENTS

| | | | | |
|---|---|---|---|---|
| 8,393,358 | B2 | 3/2013 | Saranow | |
| 8,393,363 | B2 | 3/2013 | Saranow et al. | |
| 8,567,455 | B2 | 10/2013 | Saranow et al. | |
| 8,577,750 | B2 | 11/2013 | Mourad et al. | |
| 8,655,744 | B2 | 2/2014 | Mourad et al. | |
| 8,897,915 | B2 | 11/2014 | Saranow | |
| 9,149,108 | B2 | 10/2015 | Miller et al. | |
| 9,177,339 | B2 | 11/2015 | Saranow et al. | |
| 9,414,665 | B2 | 8/2016 | Saranow et al. | |
| 10,206,478 | B1 | 2/2019 | Macedo | |
| 10,232,330 | B2 | 3/2019 | Macedo | |
| 10,532,335 | B1 | 1/2020 | Chan et al. | |
| 11,911,733 | B2 | 2/2024 | Jang et al. | |
| 2008/0189876 | A1* | 8/2008 | Trigg | A61K 8/585 8/405 |
| 2014/0082854 | A1* | 3/2014 | Landa | A61K 8/494 356/402 |
| 2016/0163146 | A1* | 6/2016 | Saranow | A45D 44/005 700/233 |
| 2016/0183664 | A1* | 6/2016 | Grez | A45D 44/005 132/200 |
| 2017/0038297 | A1* | 2/2017 | Miklatzky | G01J 3/463 |
| 2017/0119130 | A1* | 5/2017 | Witchell | G01N 21/31 |
| 2018/0008946 | A1 | 1/2018 | Macedo et al. | |
| 2018/0080865 | A1 | 3/2018 | Godfrey et al. | |
| 2018/0125207 | A1* | 5/2018 | Shami | A45D 44/005 |
| 2018/0349979 | A1* | 12/2018 | Robinson | G06F 16/583 |
| 2019/0059560 | A1* | 2/2019 | Miklatzky | A45D 19/012 |
| 2019/0143150 | A1* | 5/2019 | Dähne | A61Q 5/065 424/70.6 |
| 2019/0209984 | A1* | 7/2019 | Lubow | B67D 7/14 |
| 2023/0136185 | A1 | 5/2023 | Shami | |

FOREIGN PATENT DOCUMENTS

| | | | | |
|---|---|---|---|---|
| JP | 2017-519192 A | | 7/2017 | |
| JP | 2018-536473 A | | 12/2018 | |
| WO | WO 2009/111421 A1 | | 9/2009 | |
| WO | WO 2017/077498 | | 5/2017 | |
| WO | WO-2020057803 A1 | * | 3/2020 | A61B 5/0075 |

OTHER PUBLICATIONS

International Search Report and Written Opinion for International Application No. , Notification mailed Aug. 11, 2020.

Office Action dated Nov. 21, 2023, issued in Japanese Patent Application No. 2021-567897.

* cited by examiner

FIG. 14
CLiCS
Apps
Colors
Create App
Create Color
Libra...
All Colors
Use
Cancel
Reset
Swatch
Compare
Conversion

SYSTEMS AND METHODS FOR COLORING HAIR

CROSS-REFERENCE TO RELATED APPLICATIONS

This application claims priority benefit to U.S. provisional Application No. 62/848,471 filed on May 15, 2019 and titled "ELECTRONIC SYSTEM FOR COLORING HAIR", U.S. provisional Application No. 62/848,504 filed on May 15, 2019 and titled "SYSTEMS AND METHODS FOR COLORING HAIR", U.S. provisional Application No. 62/848,438 filed on May 15, 2019 and titled "SYSTEM AND METHOD FOR DISPLAYING HAIR COLORS", and U.S. provisional Application No. 62/848,498 filed on May 15, 2019 and titled "SYSTEM AND METHOD OF APPLYING HAIR COLORS". The disclosure of each of these applications is incorporated herein in its entirety for all purposes.

BACKGROUND

Hair coloring compositions are used for coloring human hair. Color service is a profitable area in the salon industry and can be a significant part of the cost structure of operating a salon. The components that are used to create hair coloring compositions are generally distributed separately in containers such as tubes or bottles and allow the stylist to create custom blends per client. Additionally, the components of the hair coloring composition are provided separately to prolong their useful life and avoid adverse chemical reactions that may occur if combined together.

Coloring hair is an intricate process. When coloring a client's hair, the stylist may determine a starting color for the client's hair and determine what coloring chemicals to apply to the client's hair to reach a target hair color. Based on how well the stylist identified the client's starting hair color, the application of the coloring chemicals may result in the desired target hair color or may result in a drastically different results. For example, differences in how different stylist identify the client's starting hair color may impact whether the result of the coloring chemicals is the desired target hair color or another hair color.

Moreover, some stylists lack the knowledge and skills required to select and mix the components to obtain the proper color formulation ratios for the custom hair color composition for the desired target hair color. These mistakes, mixture inaccuracies, inconsistencies and "do-overs" contribute to more waste.

SUMMARY

The systems, methods and devices of this disclosure each have several innovative aspects, no single one of which is solely responsible for the desirable attributes disclosed herein.

One innovative aspect of the subject matter described in this disclosure can be implemented in a system for color hair. The system comprises a scanning device for measuring a color of a client's hair and a hair dye dispensing system. The hair dye dispensing system comprises a first input for reading the measured color from the scanning device, a processor configured to compare the measured color to a desired target hair color and develop a coloring protocol for changing the client's hair color to the desired target color, and a dispenser for dispensing one or more formulations that follow the protocol.

In some aspects, the scanning device comprises one or more of a colorimeter, a spectral analyzer, a camera, a video camera, a digital imaging device, an image scanner, a frequency information capturing device, or an optical scanner. In some aspects, the scanning device is configured to scan the client's hair and measure one or more of a hair type, hair density, hair porosity, hair moisture level, or percentage of gray.

In some aspects, the system further comprises a memory circuit configured to store a library of lightness values that includes measurement values for each hair color generated by the one or more formulations dispensed by the dispenser. In some aspects, the library comprises a lookup table comprising a maximum lightness value and a minimum lightness value for each hair color generated by the one or more formulations dispensed by the dispenser. In some aspects, measuring the color of the client's hair comprises measuring a lightness of the client's hair and reading the measured color from the scanning device comprises reading the measured lightness. In some aspects, comparing the measured color to the desired target hair color comprises comparing the measured lightness to minimum and maximum lightness values in the lookup table to identify the measured color.

In some aspects, the hair dye dispensing system further comprises a second input for receiving the desired target hair color from one or more of a user interface or a scanning device. In some aspects, the hair dye dispensing system further comprises a second input for receiving one or more measurements of a client's final hair color and wherein the processor is further configured to identify a difference between the client's final hair color and the desired target hair color. In some aspects, the processor is further configured to update the one or more formulations based at least in part on the identified difference and correlate the updated one or more formulations in a profile for the client.

In some aspects, the system further comprises a database comprising measurements of the colors and one or more characteristics of a plurality of clients' hair. The scanning device is further configured to measure one or more characteristics of the client's hair, the first input is further for reading the one or more characteristics of the from the scanning device and for reading the measured colors and one or more characteristics from the scanning device and the one or more characteristics of the plurality of clients' hair, and the processor is configured to develop the coloring protocol based on a comparison of the measured one or more characteristics from the scanning device and the one or more characteristics of the plurality of clients' hair. In some aspects, the one or more characteristics comprise one or more of a hair health, hair color, hair type, hair density, hair thickness, hair porosity, hair moisture level, hair damage, previous formulations applied to the hair, or percentage of gray of the hair. In some aspects, the hair dye dispensing system further comprises a second input for receiving one or more measurements of the client's final hair color and the processor is further configured to store the received one or more measurements of the client's final hair color in the database. In some aspects, the hair dye dispensing system further comprises a second input for receiving one or more measurements of the client's final hair color and the processor is further configured to update the database based on the received one or more measurements of the client's final hair color. In some aspects, the processor is further configured to develop future coloring protocols based at least in part on the update to the database. In some aspects, developing the future coloring protocols comprises improving the future coloring protocols as compared to the coloring protocol to compensate for the one or more of the characteristics of the client's hair. In some aspects, compensating for the one or more characteristics of the client's hair comprises applying a model to determine how to develop the future coloring protocols to compensate for the one or more of the characteristics of the client's hair in view of the desired target hair color. In some aspects, the hair dye dispensing system further comprises a network interface configured to enable communications with one or more of the database or another hair dye dispensing system. In some aspects, the hair dye dispensing system is disposed in a first salon and the other hair dye dispensing system is disposed in a second salon different and remote from the first salon, wherein the hair dye dispensing system access client profiles for clients different from those of client profiles accessed by the other hair dye dispensing system. In some aspects, the processor is further configured to generate a client profile for the client, wherein the client profile comprises the measured color, the one or more characteristics from the scanning device, the desired target hair color, one or more measurements of the client's final hair color, and an identifier for the client and store the client profile in the database.

In another aspect, another system for coloring hair is disclosed. The other system comprises a scanning device for measuring the color of a client's hair, a database of spectral measurements associated with hair colors provided by one or more brands or lines of hair dye, and a hair dye dispensing system. The hair dye dispensing system comprises an input for a known formula from a device user interface, the known formula including a plurality of color terms, a processor configured to identify in the database of spectral measurements one or more spectral values associated with one or more of the color terms of the known formula, and a display for displaying a hair color associated with the known formula based on the identified spectral measurements, wherein the display displays the hair color by applying the known formula to the color of the client's hair as measured by the scanning device.

In some aspects, the scanning device comprises one or more of a colorimeter, a spectral analyzer, a camera, a video camera, a digital imaging device, an image scanner, a frequency information capturing device, or an optical scanner. In some aspects, the scanning device is configured to scan the client's hair and measure one or more of a hair type, hair density, hair porosity, hair moisture level, or percentage of gray. In some aspects, the database of spectral measurements comprises a lookup table of colors and color characteristics, the input for the known formula comprises one of a color formula or a color name, and the processor is further configured to generate the hair color for display based on concentrations identified from applying the input to the lookup table. In some aspects, the database of spectral measurements comprises a lookup table of colors and color characteristics, the input for the known formula comprises one of a color formula or a color name, and the processor is further configured to generate the hair color for display based on concentrations identified from applying the input to the lookup table.

In another aspects, a system for coloring hair is disclosed. The system comprises a scanning device for measuring a color of a client's hair, a database of spectral measurements associated with hair colors provided by one or more brands or lines of hair dye, and a hair dye dispensing system. In some aspects, the hair dye dispensing system comprises an input for reading the measured color from the scanning device, a processor configured to compare the measured color to the database of spectral measurements to identify a coloring protocol for changing a client's hair color to the measured color, and a dispenser for dispensing one or more formulations that follow the identified protocol.

In some aspects, one or more aspects of any of the systems described above may be integrated with any other system or aspect or incorporated into a corresponding method.

DETAILED DESCRIPTION

Figure 1:
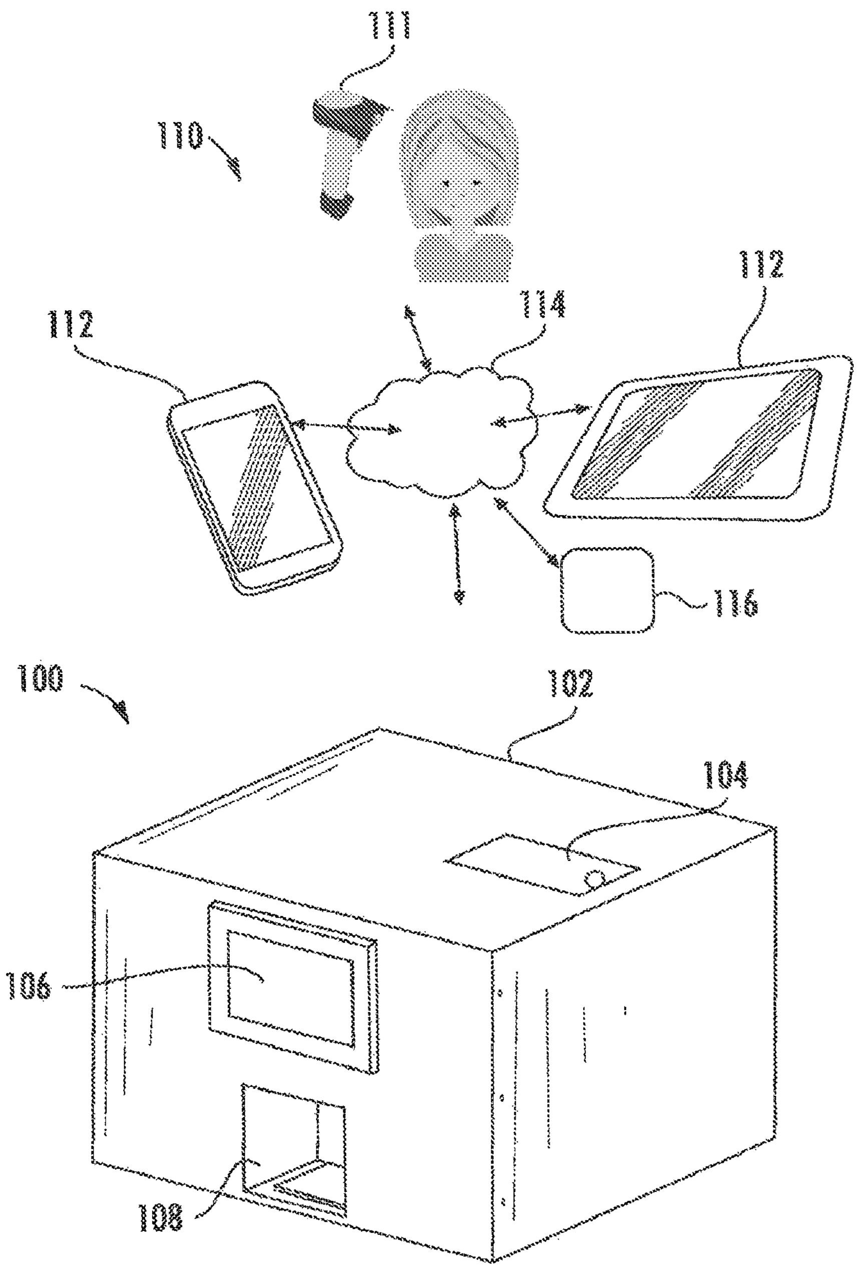
FIG. 1 is a simplified schematic diagram of a dye dispensing system environment incorporating a dye dispensing apparatus in accordance with some embodiments.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter cover all such modifications and variations within the scope of the appended claims and their equivalents.

Embodiments of the invention relate to systems and processes for measuring the existing color of a client's hair using an electronic device and then using that information to accurately provide a hair dye composition that will change the client's current hair color to a desired color. As is known, clients who desire a new hair color may have a particular target hair color in mind when entering a salon. However, it can sometimes be a challenge for a stylist to know how to change a client's current hair color into the desired color. Systems and methods described herein may use a device for measuring the client's current hair color and then run instructions to determine the proper composition to place on the client's hair to reach the target desired hair color.

In one embodiment, the device for measuring a client's current hair color may be a hand-held colorimeter device that performs a spectral analysis on the hair to return measured values of levels of primary colors reflected by the hair. However, other devices that measure the client's hair color are also contemplated. For example, the stylist may take a high-resolution photograph of the client's hair and perform an analysis of the color in the digital image in one embodiment. In another embodiment, the stylist may take a plurality of photos, or a video, and feed that data into the system for analysis of the client's current hair color. Once the starting level for the client's existing hair color is measured, and the stylist consults with the client about what the desired target color is, the stylist may enter that desired color into the system. In one embodiment, the target hair color may be entered into the system by inputting the desired colors, hues, or other color information. In another embodiment, the desired target color may be captured by entering a Pantone number into the system. In another embodiment, the target color may be captured from an existing photograph or image of a hair color printed in a magazine or other source. For example, the stylist may take a digital photograph of a hair color the client saw in a fashion magazine and the system may use that captured color as the target color so that the client may obtain the same color they saw in the magazine.

Using the captured starting color and target color information, the system may process that information along with other information from the client to determine the appropriate process for changing the client's hair color. In one embodiment, the stylist will also gather ancillary information relating to the current state of the client's hair. For example, the stylist may gather a measurement of dryness, thickness, overall hair health, and other measurements that may be used by the system to determine the correct protocol for reaching the target hair color. In some embodiments, the system will suggest a protocol involving a series of color applications that include different compositions and treatments for hair roots in comparison to the ends of the hair. In some embodiments, the system may suggest pre-lighting the hair with bleach as an initial step. The system guides the stylist through the process with suggested formulation and treatments so that the end result is the target desired hair color.

Once the stylist has applied the formulations and treatments suggested by the system, the stylist can take an "after" set of measurements with the handheld sensor (or using any of the methods described herein), to determine how close the client's new hair color is to the desired target color. The system may record this result and use the data gathered from the coloring session to update its processes and coloring calculations to provide colors and procedures to improve its accuracy in the future. Because each client's hair is different, the final results could be very different depending on hair health, thickness, porosity, gray coverage, damage, previous treatments, etc. In some embodiments, all of these data points are also gathered by the stylist during the session so that the system can make the proper determinations of processes and colors to continually improve formulations and customized treatments for each individual client.

A dye dispensing apparatus, system, and method described herein dispenses dye for hair coloring with an ability to produce a relatively large number (e.g., approximately 16,000,000) unique color formulations, and a suite of optional treatments with computer controlled, precision dispensing. The unique color formulations may be created by master chemists and produced in large batches remotely, such as at a factory, then packaged in recyclable, refillable and reusable canisters. The dye dispensing apparatus, system and method may dispense the dye from the canister such as "base tones" or "base levels" which may comprise a large portion of the dispensed color formulation; "pure tones" or "tonal values" which are highly concentrated dyes of particular colors; and "developer" which may be different strengths of peroxide and bleach. Combining these ingredients produce unique color formulas. The dye in the canisters may consist of permanents, semi-permanents, demi-permanents, bleaches/lighteners, color refreshers, temporaries, toners or developers. In another embodiment, the developer is not provided in canisters or dispensed by the dye dispensing apparatus, but is supplied in a conventional container. The canisters are configured with an internal valve that enables approximately all of the dye in the canister to be dispensed without contamination. The system also includes the functionality of inventory management and communications.

The dye dispensing apparatus or system may integrate with a data capture and chemical formulation system, for example via the network or central server (e.g., a cloud-based application, a standalone server device, etc.) or via a direct connection. The integration that, in turn, may automate inventory management by initiating automated direct replenishment shipments of the canisters. The dye dispensing system may be operated by stylists using control panels or Apps on mobile devices such as a laptop, tablet, smartphone or Web browser. Commands may be transmitted to the system from software operating on an online server or from the central server.

In some embodiments, the dye formulation identifies at least one dye and an amount of the dye. In some embodiments, the controller accesses the dye formulation from an internal database, an external database or inputs by a user. In some embodiments, the at least one canister is supported in the at least one opening. In some embodiments, the tray is configured to hold up to 50 canisters. In some embodiments, the apparatus further includes an optical sensor. The optical sensor detects the position of the at least one canister.

In some embodiments, the canister includes a valve, a nozzle and the dye. When the downward force is applied to the selected canister, the valve opens and dye is dispensed through the nozzle.

In some embodiments, the apparatus further includes a second dispenser having a second lever arm coupled to a second actuator and configured with a second projection. When the selected canister is aligned with the dispensing area, the second dispenser applies a downward force on the selected canister and dispenses the selected dye.

In some embodiments, the apparatus further includes an instrument communicating with the controller. The instrument measures a dispensed amount of the selected dye, and the dispenser stops dispensing when the dispensed amount of the selected dye equals the amount of the dye in the dye formulation for the at least one dye. In some embodiments of the method, the method further includes an instrument measuring a dispensed amount of the selected dye. The dispenser stops dispensing when the dispensed amount of the selected dye equals the amount of the dye in the dye formulation for the at least one dye. The measuring and stopping steps for each of the at least one dye is repeated until the dye formulation is complete.

In some embodiments, the aligning of the selected canister with the dispensing area is by a drive mechanism. The drive mechanism is configured to rotate the tray. In some embodiments, the apparatus further includes a shaft having an extension and the dispenser is coupled to the extension. The aligning of the selected canister with the dispensing area is by a drive mechanism. The drive mechanism is configured to rotate the shaft while the tray is stationary. In some embodiments, the apparatus further includes a track coupled to the tray having at least one cart. The cart is configured to hold at least one canister. The aligning of the selected canister with the dispensing area is by a drive mechanism. The drive mechanism is configured to translate the cart along the track.

FIG. 1 is a simplified schematic diagram of a dye dispensing system 110 environment incorporating a dye dispensing apparatus 100 in accordance with some embodiments. The dye dispensing apparatus 100 has a housing 102 made from metal, plastic, composites or a combination thereof. The housing 102 may be equipped with mounting holes to allow the apparatus to be mounted on a wall, secured to a countertop, mounted on a cart or for multiple apparatuses 100 to be coupled. A door 104 may be located in the upper area of the housing 102 (as shown) or in the sidewall of the housing 102 for access to the inside of the housing 102 such as for loading and unloading canisters or resolving any concerns that may arise. The door 104 may have a lock option. A panel 106 with a screen or display may be used to enter inputs for communication with the apparatus 100 or overall dispensing system, or to serve as an information center. For example, the panel 106 may display a power mode, a login function, a queue for dispensing, and system messages. The hair color or dye may be dispensed in a dispensing area 108, such as a nook, located in a lower area of the housing 102.

The apparatus 100 may be in communication with one or more mobile devices 112 through a network 114. In some embodiments, the apparatus 100 includes a controller 116. The controller 116 may be contained within the housing 102 or located remotely from the apparatus 100, and in communication with the system 110 through the network 114, such as the Internet, a wide area network (WAN), a local area network (LAN), etc. Thus, the controller 116 may be a micro-control unit embedded in the apparatus 100, a separate standalone remote controller or computer, a cloud-based application, or other appropriate device or combination of devices. The controller 116 may include one or more CPU or processor boards, computer displays, touch screens and interface hardware. The communication or transmitting may be wired or wireless (or a hybrid combination thereof) and may be achieved through a Wi-Fi system, Bluetooth® wireless technology, Ethernet, router, cellular communications, satellite communications or the like. The system may also be capable of performing as a Wi-Fi hub. In various embodiments, the controller 116 is a laptop, computer or mobile device such as a tablet or mobile phone. In another embodiment, a user interface may be part of the controller 116 such as when the controller 116 is configured as a laptop, computer, tablet or mobile device 112, and may be used to enter inputs for communication with the apparatus 100 or system 110, or as an information center.

In some embodiments, the system 110 also includes an optical or similar scanner 111. In some embodiments, the scanner 111 comprises any optical or other scanning or imaging device that captures information about the client's hair from a scan or image of the client's hair. In some embodiments, the scanner 111 may comprise a digital imaging device (for example a camera or scanner device) or a handheld color scanner. The scanner 111 may scan a client's hair and determine one or more characteristics of the client's hair, including, but not limited to, color, type, density, porosity, percentage of gray, moisture level, and so forth. The scanner 111 may communicate the determined hair characteristics to another device via the network 114, for example the mobile device 112 or the controller 116.

The scanner 111 can be used to determine a much more accurate hair color level and/or texture state as compared to the visual acuities of most stylists. The hair color level and/or texture state of the client's hair from the scanner 111 can be recorded and compared with other data from prior treatments (of the same client or different clients) using one or more algorithms, models, neural networks, analytics, as applied to a database of stored information. The information from the scanner 111 can also be utilized during a step-by-step process to help guide the stylist through an entire dye formulation application by taking enabling readings before, during, and after each step of an overall coloring service. Information from the scanner 111 acquired before the application of the dye formulation can help the stylist determine how far in the color space the client's hair needs to traverse (from the initial hair color) to be darkened or lightened to achieve the target color. During the dye formulation application, taking readings using the scanner 111 can help determine, in a much more accurate way, what the current status (for example, hair color, texture, etc.) of the client's hair is. The measurement may inform or instruct regarding what the next best dye formulation is to apply to the client's hair to move the client's hair to the optimal next position in the color and/or texture space (for example, to the best position to provide for obtaining the target hair color). The after readings (for example, measurements of the client's hair after the dye formulation is fully applied) will confirm whether the target level is achieved and those results will be saved into a database of prior treatments, completed results, and/or client information and/or hair characteristics.

A dye formulation identifies at least one dye and an amount of the dye. This may be the recipe to create the hair coloring compositions for the coloring service to be performed on a client. The dye formulation may be comprised of data 117 from an internal database, an external database or input from a user.

Through the network 114, requests, commands, responses and data may be transmitted. The apparatus 100 and system 110 may support the Dynamic Host Configuration Protocol (DHCP) assignment of internal IP addresses and may initiate communications over the network 114 in response to inputs. The network 114 may utilize Ethernet and Internet protocols such as TCP/IP, UDP, HTTP or HTTPS and data formats such as HTML, JSON or XML for these transactions. In various embodiments, these communications may include user interface interactions, periodic apparatus 100 timeouts, a system 110 event such as the canister being inserted or removed, or the completion of the dispensing sequence. Communications between the apparatus 100 and the controller 116 may be via a direct or independent access channel through the network 114. In the event that the primary network connectivity becomes unavailable, a backup system may be used, that is capable of reporting GPS coordinates and supporting operating communications.

In another embodiment, multiple dye dispensing systems 110 located at one site, such as a salon, or at multiple sites, may be linked together through the network 114. There may be one central controller 116 or server connecting each dispensing apparatus 100, and acting as a hub to collect data and distribute commands to the multiple dye dispensing systems 110. The central controller 116 may receive and transmit data, information or commands. Providing a network 114 in this manner enables high quality customer service and color formulation analytics.

Figure 2:
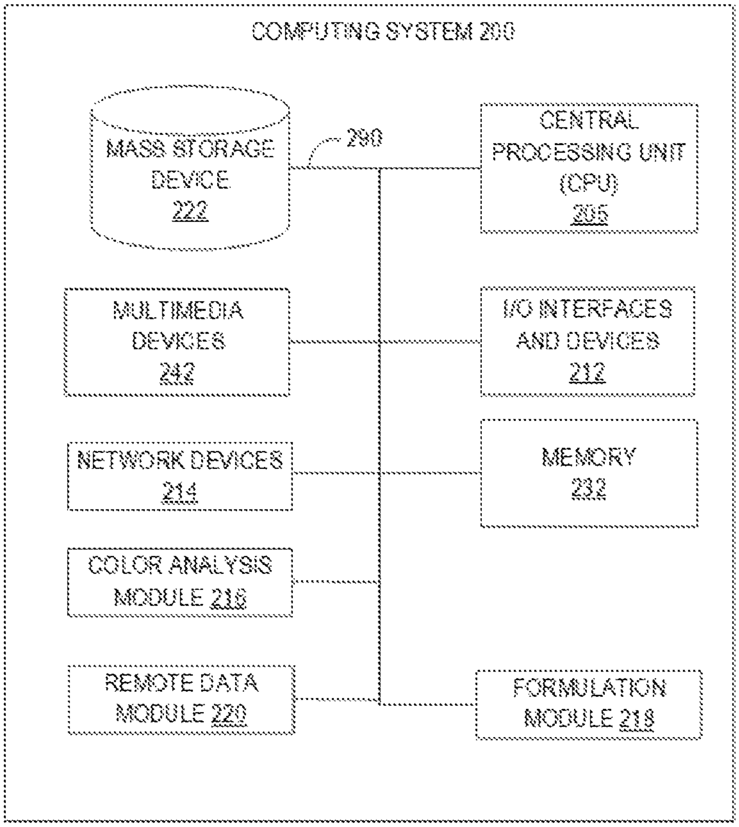
FIG. 2 shows a block diagram of exemplary components of a computing system participating in the dye dispensing system of FIG. 1, according to an exemplary embodiment.

FIG. 2 shows a block diagram of exemplary components of a computing system 200 participating in the dye dispensing system 110 of FIG. 1, according to an exemplary embodiment. In some embodiments, the computing system 200 is integrated with or within the dye dispensing system 110. In some embodiments, the computing system 200 is external from and remotely accessible by the dye dispensing system 100, for example as a remote server. For discussion herein, the computing system 200 is assumed to be part of the dye dispensing system 110. The computing system 200 may be utilized by or with, for example, the one or more mobile devices 112, the controller 116, the apparatus 100, the scanner 111, and so forth. The computing devices and systems include, for example, a computing device or system that is IBM, Macintosh, or Linux/Unix compatible or a terminal or workstation. In one embodiment, the computing system 200 includes one or more central processing unit ("CPU") 205, which may each include a conventional or proprietary microprocessor. In some embodiments, the CPU 205 may perform various computations, associations, etc., of data stored in a data store. Accordingly, the CPU 205 may enable the computing system 200 to process information in a data store and generate information for transmission to and between other devices. The computing system 200 further includes one or more memory 232, such as random access memory ("RAM") for temporary storage of information, one or more read only memory ("ROM") for permanent storage of information, and one or more mass storage device 222, such as a hard drive, diskette, solid state drive, or optical media storage device. Typically, the components of the computing system 200 are connected to the computer using a standard based bus system 290. In different embodiments, the standard based bus system 290 could be implemented in Peripheral Component Interconnect ("PCI"), Microchannel, Small Computer System Interface ("SCSI"), Industrial Standard Architecture ("ISA"), Extended ISA ("EISA"), and networked architectures, for example. In addition, the functionality provided for in the components and modules of computing system 200 may be combined into fewer components and modules or further separated into additional components and modules than as shown in FIG. 2.

The computing system 200 is generally controlled and coordinated by operating system software, such as Windows XP, Windows Vista, Windows 7, Windows 8, Windows 10, Windows Server, Unix, Linux, SunOS, Solaris, iOS, Blackberry OS, or other compatible operating systems. In Macintosh systems, the operating system may be any available operating system, such as MAC OS X. In other embodiments, the computing system 200 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 200 may include one or more commonly available input/output (I/O) devices and interfaces 212, such as a keyboard, mouse, touchpad, and printer. In one embodiment, the I/O devices and interfaces 212 include one or more display devices, such as a monitor, display screen, or similar display components that allow the visual presentation of data to a user. More particularly, a display device provides for the presentation of the user interface or GUI, application software data, and multimedia presentations, for example. The computing system 200 may also include one or more multimedia devices, such as speakers, video cards, graphics accelerators, and microphones, for example.

In some embodiments, the I/O devices and interfaces 212 provide a communication interface to various external devices. In some embodiments, the computing system 200 is electronically coupled to one or more networks, which comprise one or more of the LAN, WAN, and/or the Internet, for example, via a wired, wireless, or combination of wired and wireless, communication link via one or more network devices 214. For example, the computing system 200 is electronically coupled to the network 114 of FIG. 1 via a wired or wireless connection using the network devices 214. Using the network devices 214, the computing system 200 may communicate over networks with various computing devices and/or other electronic devices via wired or wireless communication links. In some embodiments, the network devices 214 allow one computing system 200 (for example, the apparatus 100) to communicate with another computing system 200 (for example, the controller 116 or the one or more mobile devices 112 or a database, not shown in FIG. 1). Additionally, or alternatively, the networking devices 214 may allow the scanner 111 to communicate with another computing system 200 shown in the system 110. Via such communications, the client and/or the stylist may view the scanned hair color and corresponding hair characteristics (such as porosity, density, moisture content, percentage of gray coverage of the hair, and so forth), for example on the one or more mobile devices 112 or the panel 106 of the apparatus 100. In some embodiments, the client and/or the stylist may be able to save the scanned information in association with the client, for example as part of a profile for the client that is saved in the memory 232 or the mass storage device 222.

In some embodiments, the I/O devices and interfaces 212 may generate or provide the user interface (UI). The UI may allow for clients, stylists, and/or other users of the one or more mobile devices 112, the controller 116, the scanner 111, and/or the apparatus 100 to interact with any of the devices of the system 110. In some embodiments, the UI allows the clients, stylists, and/or other users to view, update, and/or store client information (for example, the stored hair characteristics), update and/or adjust dye formulation information, input target hair color information, and so forth. In some embodiments, the UI allows for the clients, stylists, and/or other users to monitor and/or control operation of the apparatus 100, the controller 116, and/or the scanner 111.

The computing system 200 further comprises a color analysis module 216. The color analysis module may determine and/or analyze a color of an exposed sample or swatch based on a scan or optical capture of the swatch using the scanner 111. For example, an operator or user of the scanner 111 (for example, the stylist, the client, or another user) may scan the swatch with the scanner 111. The swatch may comprise a sample of human hair, natural fabric, yak hair, synthetic fabric, and so forth having a particular color. The output of the scanner 111 may comprise one or more International Commission on Illumination (CIE) LAB values. The color analysis module 216 may receive the LAB values from the scanner 111 and generate a library of lightness values for a lookup table of hair colors and/or to identify a hair color or dye color for the swatch from the lookup table.

In some embodiments, the scanner 111 and the color analysis module 216 generate a library of lightness values. The library of lightness values may be specific to a particular brand or line of hair color or may be an aggregate of all or many brands or lines of hair color. The library of lightness values, when complete for a particular line of hair color, will includes measurement values for every formulated color for that line of hair colors. When the library of lightness values is complete for all or many lines of hair colors, the library will include measurement values for every formulated color for the included lines of hair colors.

When generating the library of lightness values for the lookup table, the scanner 111 measures the CIELAB values for the various hair colors applied to the swatches for the one or many brands of hair color. In some embodiments, the CIELAB measured values, which include a lightness value for every measured hair color, are stored, for example in the mass storage device 222 or the network storage. The CIELAB values for the swatches may be further measured using a spectrophotometer and the corresponding CIELAB values from the spectrophotometer are also stored, for example in the mass storage device 222 or the network storage. Once the lightness (L) values are known for each of the swatches, the lookup table is created. The lookup table may include a column with the hair color (for example, the 1N-12N identifiers for natural hair colors, etc.) with corresponding lowest and highest acceptable lightness values (from the scanner 111 and the spectrophotometer) for the particular hair color in second and third columns. Thus, a single row in the lookup table may include (1) the particular identifier (for example, name, number, and so forth) for the hair color in a first column, (2) the corresponding minimum lightness level associated with the identified hair color in a second column, and (3) the maximum lightness level associated with the identified hair color in a third column.

Once the lookup table is generated, the color analysis module 216 may identify a color of a scanned client's hair (scanned via the scanner 111) or of a scanned swatch or sample using the data in the lookup table. For example, the stylist (or the client) scans the client's hair at three different locations to identify the CIELAB measurements associated with the client's hair. The three locations may include a root location of the client's hair, a shaft location on the client's hair, and a tip location of the client's hair. The measurements from the scanner 111 may be conveyed to the computing system 200 and the color analysis module 216 may identify a single lightness value that corresponds to all three measurements of the client's hair. For example, the color analysis module 216 (or the scanner 111) averages the lightness measurements from the three measurement locations to generate the single lightness measurement. In some embodiments, the color analysis module 216 (or the scanner 111) generates a median value for the three lightness measurements as the single lightness measurement. In some embodiments, other calculations are used to determine the single lightness measurement. In some embodiments, the three lightness measurement values and the single lightness measurement are stored in the mass storage device 222 or the network storage.

Based on the determined single lightness measurement, the color analysis module 216 references the lookup table to identify the hair color level (for example, the name, identifier, and so forth) associated with the single lightness measurement based on the single lightness measurement falling between the minimum and maximum lightness levels for a particular hair color. For example, the color analysis module 216 identifies that the single lightness measurement is L=34, the color analysis module 216 references the lookup table to identify the hair color level for which L=34 falls between the corresponding minimum and maximum lightness measurements. If the color 8 has a maximum L value of 35 and a minimum L value of 30, then the color analysis module 216 identifies that the client's hair color level corresponds to color level 8. In some embodiments, the color analysis module 216 may calculate an exact hair color level based on a relationship between the single lightness measurement and the minimum/maximum lightness levels. For example, the single lightness measurement of L=34 with the minimum and maximum L values being 30 and 35, respectively, the color analysis module 216 may determine that the client's hair color level is 8.8 (the 30 getting to color level 8 and then the 4/5 getting to color level 0.8). The color analysis module 216 may round the 8.8 color level to the nearest whole (9) or half (8.5) color level. In some embodiments, the color analysis module 216 provides the identified color level for display to the client or the stylist via the UI of the computing system 200. The identified color level may also, or alternatively, stored with the client's profile or in the mass storage device 222 or the network storage. In some embodiments, a name or image of the color corresponding to the color level may be displayed via the UI for visual confirmation by the client and/or the stylist.

Alternatively, instead of determining the single lightness measurement that corresponds to the three measurements from the client's hair, the color analysis module 216 may identify colors, from the lookup table, corresponding to the lightness measurements from the three measurement locations. Accordingly, the color analysis module 216 may identify up to three different color levels (or more color levels if more than three measurements are taken from the client's hair) depending on how different the lightness measurements are from each other for each measurement location.

The identified color(s) of the scanned client's hair may correspond to the starting or initial hair color(s) for the client. Using the scanner 111 and the lookup table in conjunction with the color analysis module 216 may identify a more precise or exact initial hair color(s) for the client as compared to using just the visual acuities of the stylist. Accordingly, integrating the lookup table, the scanner 111, and the color analysis module 216 may reduce variability or inconsistencies in applying hair coloring to client's hair because stylists may not be able to accurately "eyeball" the client's initial hair color(s) without variation between stylists. By not identifying the initial hair color(s) accurately (for example, without using the scanner 111, the lookup table, and the color analysis module 216), the identification of the formulation to apply to the client's hair to obtain the desired target hair color may be incorrect and result in the wrong end hair color.

The computing system 200 also include a formulation module 218. The formulation module 218 may determine a dye or color formulation to apply to the client's hair based on various inputs. For example, the computing system 200 determines, using the color analysis module 216, the client's initial hair color(s) and receives, via the UI, the client's target hair color(s). Based on the determined initial hair color(s) and the received target hair color(s), the formulation module 218 may determine a proper formulation or combination of formulations to transform the client's hair color as desired. In some embodiments, when the formulation module 218 determines the formulation or combination of formulations, corresponding formulation information is displayed to the client or the stylist via the UI for verification.

For example, when the lightness measurements described above are different for the roots and tips of the client's hair and the client's target hair color is the same regardless of location in the client's hair, the formulation module 218 generates different formulations for application to the different locations of the client's hair. When the roots are lighter than the tips, the client's hair may need a darker formulation to apply to the roots as compared to the tips. In some embodiments, the formulation module 218 may determine that pre-lighting the client's hair with bleach is needed as part of the transforming to the target hair color. Given the various complexities in coloring the client's hair, the formulation module 218, in conjunction with the color analysis module 216, the scanner 111, and the lookup table, improves accuracy and efficiency of the hair color process applied by the stylist and helps the stylist achieve the desired results by taking any guesswork out of identifying the formulations to achieve the client's target hair color.

As such, the formulation module 218, regardless of the device of the system 110 on which or in which it operates, may communicate the formulation determined based on the initial client hair color(s) and the target client hair color(s) to the apparatus 100 to dispense into a receptacle 154 for the stylist to apply to the client's hair. In some embodiments, the formulation generated by the formulation module 218 is communicated to the stylist for the stylist to review and/or adjust before dispensing the color from the apparatus 100. In some embodiments, the stylist generates or picks formulations without reviewing results from the formulation module 218.

After the stylist applies the formulation(s) to the client's hair, and after washing any excess color out of the client's hair and drying the hair, the stylist or the client can take "after" lightness measurements of the client's hair with the sensor 111. The after lightness measurements can be compared to the desired target hair color to determine how close or far the end color is from the target color. In some embodiments, the color analysis module 216 may identify a difference between the end color and the target color (for example, a difference in lightness values or color levels). The difference may be stored in the mass storage device 222 or the network storage in association with the client profile, for example. In some embodiments, the difference identified can be associated with the client and then used to update future formulation determinations by the formulation module 218. For example, the formulation module 218 may update its algorithms and/or formulation selections to get closer to the target color in a future application. Because each client's hair may respond differently to the formulations, even if two clients have the same initial hair color and identical formulas are applied, the end color could be very different depending on the various characteristics of the clients' hair, including hair health, thickness, porosity, gray coverage, damage, previous treatments, and so forth. Accordingly, saving before and after measurements may assist in improving the accuracy of the apparatus 100 and the formulation module 218. This logged data may provide for continually improving formulations and customizing treatments for each individual client.

As an example utilizing just one dimension of lightness from the CIELAB measurements, assume that the starting L value of the client's hair is L=40 and that the client wishes to have darker hair, L=30. The stylist (or the formulation module 218) creates a formula that results in L=30, as measured on a swatch. But when that formula is applied to the client's L=40 hair, the final result may actually be L=25, too dark, because the client's hair is very porous and absorbs the color more than expected. By storing the before and after measurements, the system 110 would be aware of the over absorption of color and, in the future, choose a target hair color that has L=35 so that the formulation, when applied to the client's hair, results in the target level of L=30. Alternatively, if the client wanted a much lighter color, for example L=60, the formulation generated may include first bleaching the client's hair up to L=70 and then applying another formulation that darkens the hair down to L=60.

The examples and embodiments described herein refer generally to lightness measurements as a result of the CIELAB measurements. However, it is understood that similar associations, lookup tables, etc., exist for the color components from the CIELAB measurements. For example, the CIELAB measurements include lightness values, green to red color values, and blue to yellow color values. Accordingly, in some embodiments, the different color values from the CIELAB measurements may be used to generate additional lookup tables or to add additional information to the single lookup table to allow for the color analysis module 216 to identify the initial hair color based on lightness and color values. This would also allow the formulation module 218 to generate formulations to transform from the initial hair color to the target hair color based on lightness and color measurements.

The computing system 200 further comprises a remote data module 220. The remote data module 220 may integrate the system 110 with a network 210 and a networked database 208 (described in more detail with reference to FIG. 6 described below). In some embodiments, the remote data module 220 stores data in and/or retrieves data from the networked database 208. The remote data module 220 may further perform one or more functions on the data retrieved from the networked database 208. For example, the remote data module 220 may perform one or more of analysis of, models on, apply neural networks to, and/or otherwise use the data stored in the networked database 208 to improve coloring sessions of clients.

In some embodiments, the remote data module 220 in one of the devices for each system 110 may store information captured from the scanner 110 into the networked database 208. The information retrieved from the database 208 can be stored locally and/or used by the remote data module 220 in analysis to improve dye formulation for a coloring session of a current client. In some embodiments, the remote data module 220 may apply one or more models, neural networks, and so forth to compute the most probable results for a particular coloring session using the information received from the scanner 111 as applied to the client's hair. In some embodiments, the models, neural networks, and so forth, may combine the information from the scanner 111 applied to the client's hair with information (for example, from the networked database 208) regarding hair characteristics, etc., from prior clients to expand the probable results and consequent dye formulations to achieve a target color tone or texture. The remote data module 220 may use the analysis, modeling, and/or neural networks to generate outputs of how to modulate and/or adjust a dye formulation by the formulation module 218. Thus, the formulation module 218 may use inputs from the remote data module 220 to adjust and/or generate a dye formulation to change the client's hair color from the initial color value to the target color value such that the end color value is closer to the target color value than without using inputs from the remote data module 220. The generated dye formulation (or pigment or other chemicals) may be delivered electronically to the apparatus 100, as described herein, which contains one or more dyes, pigments or other materials and which dispense the proper amounts of the materials to achieve the target color tone or texture within a determined range of exactness to the target color tone or texture.

As described herein, for hair color applications using dyes, pigments or bleach, the underlying process may involve capturing the starting, interim, and ending color or texture status information before, during, and after one or more steps of the dye formulation application. In some embodiments, with each step of the dye formulation application, the database 208 is mined by the remote data module 220 for any data that may be used to improve the next step in the dye formulation application. In some embodiments, the improvement may comprise an adjustment in the dye formulation that accounts for information captured for the client's hair during the dye formulation application as compared to information analyzed, processed, and so forth in view of the models and/or neural networks applied to the database information. In some embodiments, the adjustment of the dye formulation may be made based on determining, by the remote data module 220, the most comparable information in the networked database 208 to the client's hair and using that information to create updates and/or formulas for each step of the dye formulation application to achieve the target color tone or texture result.

In some embodiments, the remote data module 220 may use multiple sources and types of information (for example, information from the local scanner 111 and information from the networked database 208) to improve the probability of generating a dye formulation that includes the correct amounts of each of the chemical elements, dyes, and so forth, that are required to accurately achieve the target color tone and/or texture given the initial color tone and/or texture. An ability to use modeling and/or the neural network or similar processing to successfully predict what dye formulations, and so forth, will accurately achieve the desired color tone and/or texture reduces an amount of manual testing that is required by stylists, and so forth, to validate that the dye formulation recommended by the system 110 is valid and best suited to reach the target color tone and/or texture without having to do manual testing to confirm the large number of manual tests that would be required otherwise.

In some embodiments, the computing system 200 receives information over the network 114 of FIG. 1 from one or more of the devices of FIG. 1 (for example, the apparatus 100, the one or more mobile devices 112, the controller 116, and so forth). In some embodiments, a networked data storage (not shown in this figure) stores data for the one or more mobile devices 112 or the controller 116 and/or any other computing devices that is local to or remote from any of the devices shown in FIG. 1. In some embodiments, one or more of information from the customer profile for each customer, previous characteristics of customer hair, previously applied formulations, and/or results from previously applied formulations is stored in the networked data storage. The data storage may include one or more internal and/or external data sources that store and/or provide corresponding data described above. The data sources may include internal (for example, local or first-party) and external (for example, remote or third-party) data sources which store, for example, one or more of the customer profile for each customer, hair characteristics, relationships between hair characteristics and dye formulations, results from dye formulation applications, and so forth.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the one or more mobile devices 112 or the controller 116, for execution by the computing system 200. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware, or a combination thereof. Generally, the modules described herein refer to logical modules that may be combined with other modules or divided into sub-modules despite their physical organization or storage.

Figure 3:
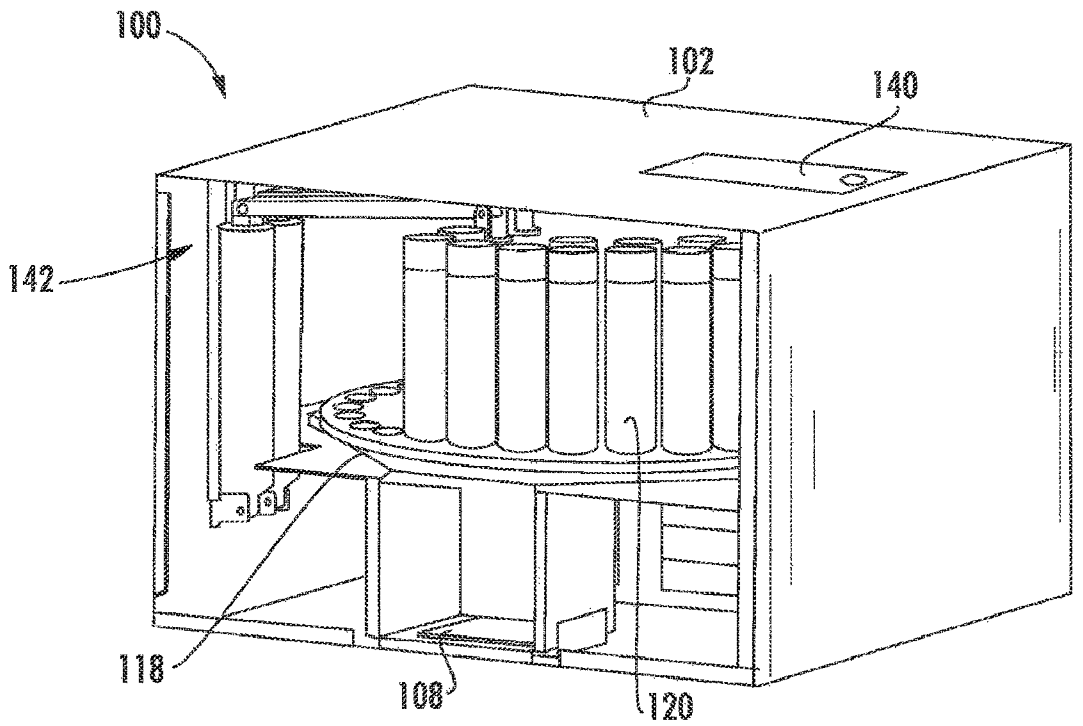
FIG. 3 is a perspective view of a portion of an interior of the dye dispensing apparatus shown in FIG. 1 in accordance with some embodiments.

FIG. 3 is a perspective view of a portion of an interior of the dye dispensing apparatus 100 shown in FIG. 1 in accordance with some embodiments. A tray 118 within the housing 102 may be coupled to the housing 102 and is configured to hold at least one canister 120. A bearing may be coupled to the tray 118, enabling the tray 118 to rotate. The tray 118 may have any shape such as a round, carousel configuration and may be operated by a drive mechanism 124 such as a motor. The tray 118 communicates with the controller 116. In other embodiments, the tray 118 is fixed. The tray 118 is configured with at least one opening.

In some embodiments, there may be multiple rows of openings, such as two concentric rows. For example, the tray 118 may contain up to 50 openings arranged in two rows, having an inner row with 20 openings and an outer row with 30 openings. In other embodiments, the tray 118 may be square-shaped with 40 openings arranged in four rows. In yet another embodiment, the tray 118 may be octagonal-shaped with 40 openings arranged in clusters. The shape of the tray 118 and the arrangement of the openings is customizable depending on the application. The ability to change the size, shape and number of openings enables the apparatus 100 to be reduced in overall size to accommodate space constraints in the salon. Moreover, the overall size of the apparatus 100 can be reduced if the particular application requires a small number of canisters 120. For example, the salon may offer a limited amount of color formulations thus only needing 10 canisters 120 instead of up to 50 canisters 120.

Each canister 120 may comprise an identifier, an internal valve, a nozzle, a sleeve and dye. The sleeve is configured to contain the dye. In one embodiment, the canister 120 is modular and interchangeable with one another. The storage capability may be, for example, up to 8.6 ounces but may also vary depending on the size of the sleeve. In practice, the dye cannot be exposed to air until just before the color treatment. Therefore, the canisters 120 are airtight and may be composed of a metal such as aluminum, composite or a combination thereof.

Each canister 120 is labeled with a unique identifier such as a barcode, QR code, catalog number or icon code. The identifier may be scanned, read and recognized by a device such as a reader or scanner. The reader may be a standalone unit or part of the controller 116 and located within the housing. The reader may be coupled to the sidewall or top wall of the housing, on the dispenser or any location with a direct view of the canisters 120. Other technologies may be used for uniquely identifying the canisters 120 such as by RFID (radio-frequency identification) technology, NFC (near-field communication) technology or the like. In some embodiments, the identifier verifies the presence of the canister 120 in the apparatus 100 and identifies the particular contents in the canister 120 such as the color of the dye. Other information may be included in the identifier such as the product name, date the canister 120 was filled with the particular dye, the amount of the dye remaining in the canister 120, a lot or batch number and any other notes the manufacturer may wish to include.

The reader communicates with the controller 116. The reader is configured to scan, read and recognize the identifier labeled on the canister and communicates the information to the controller 116. The controller 116 may recognize the information embedded in the identifier such as product name, quantity remaining in the canister 120 and lot or batch number. In another embodiment, there may be two or more readers designed to identify the canister 120 located in particular areas of the tray 118. For example, one reader may identify the canisters 120 in an inner row of the tray 118 while another reader identifies the canisters 120 in the outer row of the tray 118.

The canister 120 may be recyclable, refillable and reusable in the system 110 and is configured to be pressurized by a gas. The canister 120 may include a port for injecting the gas. For example, the canister 120 may be a nitrogen pressurized canister 120. The gas and dye are separated within the canister by an internal sleeve that enables the dye to move uniformly downward towards an internal valve when external force or pressure is exerted on the canister 120. When a force is applied on the top of the canister 120, a valve may be pushed against a protrusion on a coupler, thus opening the valve and allowing dye to be dispensed through a nozzle. The internal valve enables the canister 120 to dispense approximately all of the contents within, such as the dye, through the nozzle via the apparatus 100. In another embodiment, the canister 120 utilizes a gravity-feed system in which gravity is used to move the dye 134 downward through the canister 120.

The dispenser 142 includes at least one actuator. The actuator can include mechanical and electrical components such as a solenoid, motor and/or piston and rod assembly; a lever arm; and a projection. The actuator communicates with the controller 116. The actuator is coupled to a first end of the lever arm, and the projection is coupled to a second end of the lever arm. A mounting bracket couples the dispenser 142 to a surface such as the housing 102. The mounting bracket is coupled to the lever arm at a junction. The junction serves as a support and a pivot point for the lever arm. When the actuator is activated, an internal rod of the actuator is moved in an upward direction causing the lever arm coupled to the first end of the actuator to also move in an upward direction. At the junction, the lever arm moves in a downward direction, as in a teeter-totter effect, thus enabling the projection to move in a downward direction and contact the surface of the canister 120 (not shown). This action applies pressure on the canister 120 and the dispensing of the dye begins.

In some embodiments, the projection is configured to pivot and rotate enabling full contact with the top of the canister 120. The projection is a component that extends from the end of the lever arm and in some embodiments, the projection may be part of the lever arm. The projection is designed to optimally mate with the top surface of the canister 120. In some embodiments, projection may have a flat or curved surface with a spring-like material such as plastic or rubber to provide flexibility and suction. In other embodiments, the projection 148 is composed of a rigid material providing resistance to the top surface of the canister 120.

When the canister 120 is aligned with a dispensing area 108, the dispenser 142 applies a downward force on the canister 120 and dispenses the dye. For example, the controller 116 communicates with the reader. The reader, based on the identifier, identifies a selected dye in a selected canister 120 associated with the dye formulation. The selected canister 120 is aligned with the dispensing area 108. The controller 116 communicates with the actuator which activates and positions the lever arm with the projection directly above the selected canister 120. The dispenser 142 applies a downward force on the selected canister 120 while the projection is in direct contact with top surface of the canister 120. This opens the valve of the canister 120 and causes dye to escape through the nozzle of the canister 120. The dye is dispensed in quantities such as 0.01 grams to 140.00 grams and in any programmed ranges.

The controller 116, via the dispenser 142, starts and stops the dispensing of the dye allowing for variable dispensing rates. For example, the dispensing may start slow, increase, level off and then decrease as it approaches dispensing the required amount of dye. The rate of dispensing may be customized depending on the amount of dye to be dispensed and the time the apparatus 100 needs to complete the dye formulation. In another embodiment, there may be a second dispenser in the apparatus 100 that operates similarly to the first dispenser. When there are multiple dispensers, the dispensers may operate one at a time, alternately or simultaneously.

The apparatus 100 further includes an instrument communicating with the controller 116. The instrument measures a dispensed amount of the selected dye, and the dispenser stops dispensing when the dispensed amount of the selected dye equals the amount of the dye in the dye formulation for the at least one dye. A plate is located in the dispensing area 108 and vertically below the at least one opening with the selected canister 120. The plate may be configured with the instrument to measure the contents on the plate. The instrument may be a transducer, a scale, a gauge such as a strain gauge, or a combination thereof. A receptacle is located on top of the plate. The receptacle, such as a cup or a bowl, collects the dye as it is dispensed from the canister 120. The receptacle may lock or snap into the plate to ensure stability. The instrument measures the amount of dye dispensed then communicates this data to the controller 116. In one embodiment, the dispensing will not occur unless the receptacle is in the proper position. This may be indicated visually with an indicator light. The measuring and stopping steps for each of the at least one dye may be repeated until the dye formulation is complete.

Figure 4:
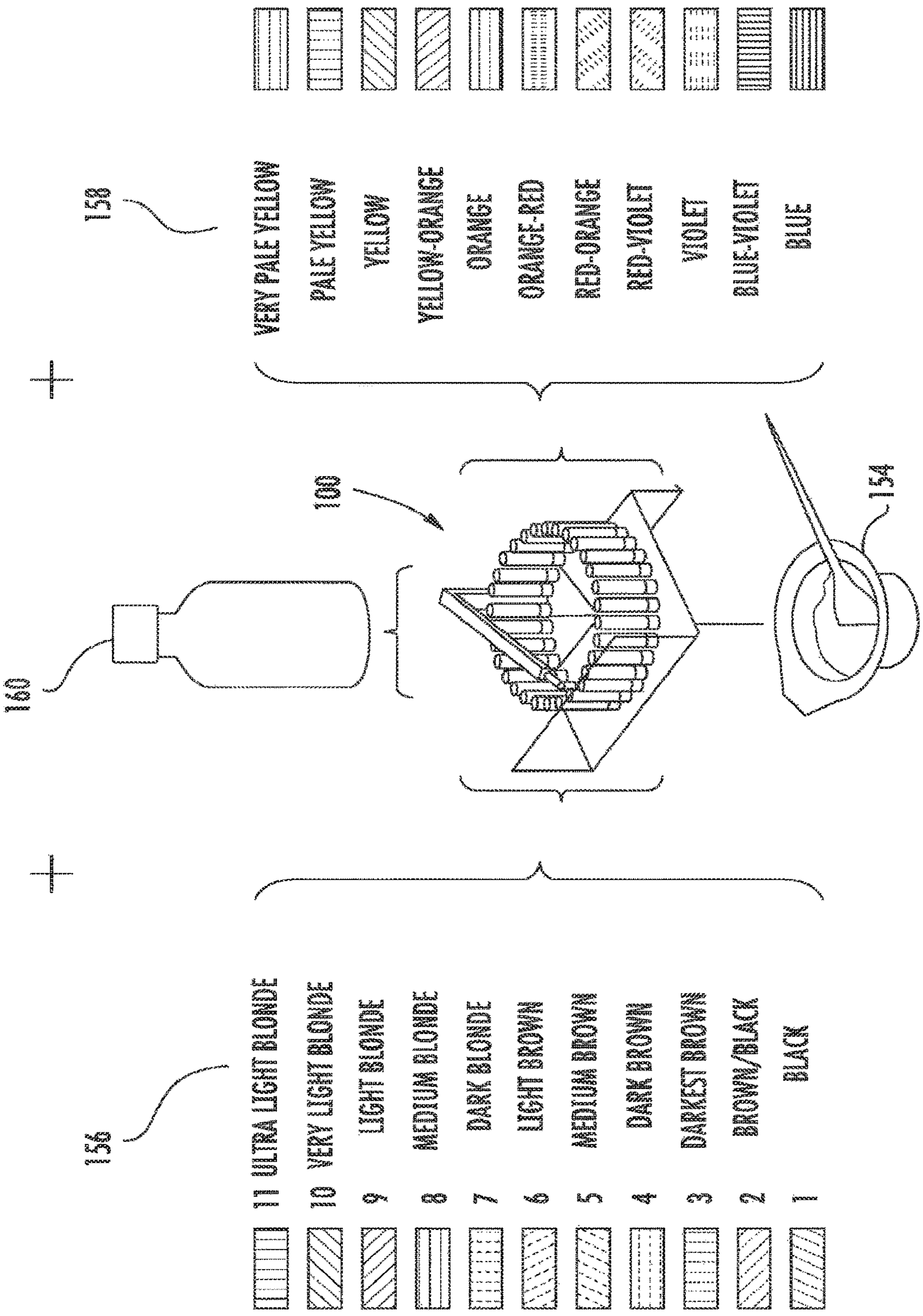
FIG. 4 illustrates a simplified schematic of components used in a method for preparing a dye formulation in accordance with some embodiments.

Typically, the salon industry relies on the knowledge and ability of the stylist to create the dye formulation, distributing the correct amount of the dye comprising the dye formulation and hand mixing. This may lead to inaccuracies and non-repeatable results. The present dye dispensing system and method which offers unique hair coloring compositions in recyclable, refillable and reusable canisters reduces waste and improves hair color services with dye formulations and dispensing control, thus retaining customers while providing new client opportunities. FIG. 4 illustrates a simplified schematic of components used in a method for preparing a dye formulation in accordance with some embodiments. In this embodiment, the components may be base levels 156 of various colors and tonal values 158 of different pigments contained in the canisters 120. These components are dispensed by the apparatus 100 according to the dye formulation and collected in the receptacle 154. A developer 160 of, for example, 5-40% may be added to or be part of the dye formulation to produce the final hair coloring composition to use on the hair of a client.

In a non-limiting example, a client would like to change the color of her hair. To use the dye dispensing apparatus 100 and method 1100, the stylist uses a user interface such as a device 116, such as a laptop, computer, tablet or mobile phone. This may be through an App or software package or program. The stylist inputs information about the client on which the dye formulation will be applied, such as color desired, length of hair, thickness of hair and texture of hair. The controller 116 generates a request for the dye formulation based on the information. The dye formulation is comprised of data 117 from an internal database, an external database or input from a user. For example, in some embodiments, the dye formulation may be created by the controller 116 accessing a database stored in the controller 116 or stored remotely from the apparatus 100 or the user may input the dye formulation.

The dye formulation includes an identifier 128 and a specified amount of dye 134 for each of at least one dye 134. The dye formulation, like a recipe, may be comprised of at least one dye 134, including the identifier 128 and quantity of each dye 134 needed to complete the dye formulation. In this example, three different dyes 134 are required for the dye formulation. For example, 0.1 grams of dye F1, 5.05 grams of dye F2 and 4.03 grams of dye F3 comprise the dye formulation.

In one embodiment, a formulation code is generated and input into the panel 106 of the apparatus 100 or through the user interface, the device 112, such as a computer, laptop, tablet or mobile phone which may be the same as the controller 116. The formulation code may also be associated with the particular stylist and be used to track different information or aspects by stylist. For example, the stylist enters the formulation code on a touch screen, or panel 106, located on the apparatus 100. In another embodiment, the stylist enters the information on a personal mobile device 112. The controller 116 then transmits a signal to the reader and the reader reads the identifier on the canisters 120 and identifies a selected dye in a selected canister 120 associated with a dye formulation such as dye F1 based on the identifier. The controller 116 transmits a signal to a drive mechanism such as a motor, and in this embodiment, the drive mechanism rotates the tray 118 until the selected canister 120, dye F1, is aligned with the dispensing area 108. The actuator receives a signal from the controller 116, and the lever arm is moved or translated until the projection is directly above the selected canister 120 of dye F1. A downward force is applied on the selected canister 120 of dye F1 by the actuator and through the lever arm and projection applying pressure on the selected canister 120 of dye F1. In one embodiment, 10-15 psi of pressure is applied for approximately 0.01 seconds to 3.0 seconds so that 0.01 grams of dye F1 is dispensed. The dye is dispensed through the nozzle and collected in the receptacle 154 which is positioned on the plate 150 of the dispensing area 108.

The instrument, such as the transducer, coupled to the plate measures the dispensed amount of the selected dye associated with the dye formulation and provides feedback to the controller 116, so that the controller 116 can stop the dispenser 142 from dispensing. The dispenser 142 stops the dispensing when the dispensed amount of the selected dye equals the amount of the dye in the dye formulation for the at least one dye. This ensures the precise quantity of dye dispensed. In this example, the instrument measures the dispensed dye F1 and transmits a signal to the controller 116 reporting that 0.01 grams of dye F1 was received. The controller 116 then sends a signal to the reader to find the next identifier 128, dye F2, in the dye formulation. The steps in the method are repeated, as well as repeating the measuring and stopping steps for each of the at least one dye until the dye formulation is completed. This includes identifying the canister 120 for dye F2, rotating the tray 118, dispensing the selected dye and measuring the amount of dye dispensed. The method 1100 is then repeated to dispense the contents of dye F3. Once the contents of dye F1, dye F2 and dye F3 are dispensed, the dye formulation is complete. In some embodiments, F1, F2, F3 to F(x) may also be a developer instead of a dye. When the dye formulation is complete, the stylist is notified by an indicator light and/or a message on the user interface or panel 106.

The canisters 120 may be recyclable, refillable and reusable so that when all of the dye is dispensed from the canister 120 and the canister 120 is empty, the canisters 120 may be refilled and reloaded into the dye dispensing apparatus 100. In one embodiment, the canister 120 is refilled remotely by the manufacture and then shipped to the salon. The refilled canister 120 may be loaded in the apparatus 100 through the door 104 in the housing 102.

The apparatus, system or method may send notifications in the form of an indicator light, messages on the user interface or the like, during operation. For example, the stylist may be provided with instructions on the user interface to load a particular canister 120. This may occur if the required dye within the canister 120 is not available in the apparatus 100, or if a particular canister runs out of dye during dispensing, or if the dye dispensing apparatus, system or method malfunctions.

Figure 5:
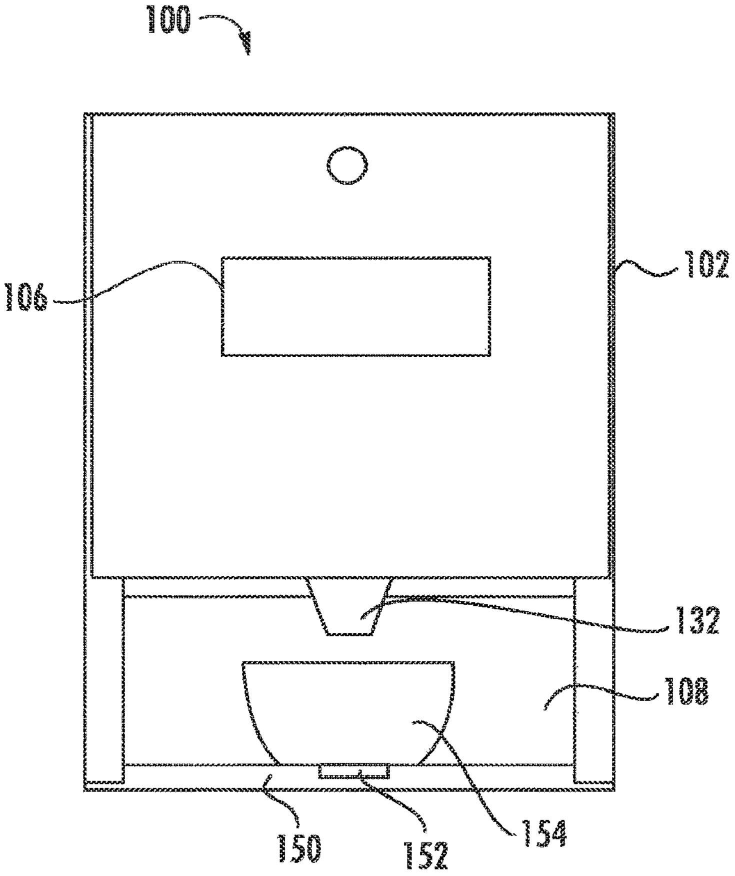
FIG. 5 is a front view of the dye dispensing apparatus of FIG. 1 in accordance with some embodiments.

FIG. 5 is a front view of the dye dispensing apparatus 100 in FIG. 1 in accordance with some embodiments. The apparatus may be operated by the panel 106 or by the mobile device 112. In one embodiment, a plurality of apparatuses 100 are mounted together, each having one canister 120, communicating and controlled by the controller 116. The dye formulation is comprised of different dyes, for example, F1, F2, F3 to F(x) and may be communicated to the user on the panel 106 or by the mobile device 112. After F1 is dispensed, the receptacle 154 may be moved to the next apparatus 100 where F2 is dispensed. After F2 is dispensed, the receptacle 154 may be moved to the next apparatus 100 where F3 is dispensed, and so on, until the dye formulation is complete. Alternatively, there may be only one apparatus 100 and the selected canister 120 may be loaded after each dye is dispensed until the dye formulation is complete. The user may be directed via the user interface to accomplish the loading and unloading of the canisters 120 and/or moving the receptacle 154 to collect the dispensed dye 134.

The dye dispensing system or method is a comprehensive solution providing precision repeatability for custom dye formulas, packaging innovation, aid for the open stock inventory, and reordering capabilities. In some embodiments, virtually all of the dye within the canister is utilized. The salon industry generally struggles with waste during color services, inventory management expense and carrying costs, customer retention issues associated with the quality of hair color formulations and high customer acquisition costs. For hair dye, the industry generally relies on a small container such as a tube filled with dye. When performing a color service on a client, the stylist mixes the color hair by using a portion of the dye from the tube and multiple tubes are typically required. This stresses the environment with excessive packaging and waste because leftover hair color and packaging are distributed into water systems and landfills. Additionally, the unused portion of the dye in the container often goes to waste because it may not be needed for another client or is ruined due to oxygen exposure. By utilizing the canisters as opposed to the typical tubes of dye, tube, dye waste and packaging are eliminated. The typical tube of dye is approximately 1.7 ounces to 3.2 ounces. By using the canisters which in one embodiment, is configured to contain 8.6 ounces, many tubes are replaced with one recyclable, refillable and reusable canister.

The dye dispensing system 110 may be configured to track inventory and generate reports. For example, the identifier of each canister 120 may be read during installation, and thereby the dye dispensing system 110 may monitor, track and reorder inventory. A self-diagnostic scan may be performed by the controller 116 or reader, or a combination of the two, to monitor the current operation status, location errors, warnings or failures.

The dye dispensing system 110 may automate the reordering process of the canisters 120 and salon payment processes. For example, an inventory management system may initiate replacement orders. The orders may be with an exclusive vendor that provides automatic shipping thus saving the salon owner inventory carrying costs and management labor. The inventory may be vetted against shipping data to track the information from order to delivery. The canisters 120 with the dyes may be automatically invoiced and purchased electronically and automatically thus minimizing the payment effort and streamlining the processing of accounts receivable of the salon. In some embodiments, the method has a tiered marketing strategy offering direct sales to top tier salons and manufacturer representatives for lower tiers. In other embodiments, factory direct shipping of the canister reduces shipping costs and outer packaging.

Conventionally, the stylist hand-mixes the dye combinations of hair colors that are manually dispensed from tubes, containers or bottles. The industry relies on rudimentary hand-mixing tools. A poorly mixed hair color formula may result in hot spots on the scalp and inconsistent color results on the hair. In one embodiment, a cap for the receptacle 154 is provided. The cap is configured with an opening which the dispensed dye may flow through when the cap is coupled to the receptacle. The cap may also be configured with a whisk driven by a motor. When the cap is coupled to the receptacle 154, the dispensed dye in the receptacle 154 may be mixed by the whisk to the correct consistency, thereby mixing all of the dye evenly so as not to leave any unmixed color on the surface of the receptacle 154. The whisk may be configured to be disconnected from the motor by, for example, a push and turn mechanism operating counterclockwise to the rotation of the whisk. The material of the receptacle and whisk may minimize friction and aid in cleaning hydrophobic materials. The whisk may removable and cleaned after each use.

In another embodiment, the dye dispensing system 110 is configured with a 360° image capturing capability, designed to produce an image of the client's head and shoulders. An associated application would provide an avatar of the hair and face along with a pallet of dye colors to try on, allowing the client to visualize how they would look with various colors of hair. Once selected, the target color may be translated into a formula for distribution by the dye dispensing system 110. In a further embodiment, an optical scanner may capture a three-dimensional image of the client that may be used to calculate the volume of dye required to color the hair and transmit the information to the dye dispensing system 110.

In yet another embodiment, the dye dispensing system is configured with a sensor to provide hair color feedback. Digital profiles of the client's hair before and after the hair color applications may be evaluated to access the quality of the dye formula in relation to the target color selected by the client. The hair of each client has differing characteristics that impacts the results of the hair color treatment. The feedback loop may provide data for optimizing the formula towards the target color with each use based on algorithms to translate the differences between the target and actual color into formulations that are optimized and customized per client. As data is gathered from clients, the system may be capable of learning formula adjustments thereby accurately creating formulas that achieve the target color with a smaller number of applications. This capability may also improve "first time" applications which are a common source of anxiety for stylists and clients.

In further embodiments, the apparatus 100 and method can dispense other liquids such as, for example, developer, shampoo, conditioner or additives or any combination thereof.

Embodiments of the invention relate to systems and processes for measuring the existing color of a client's hair and then using that information along with aggregated information from a plurality of other clients to accurately provide a hair dye composition that will change the client's current hair color to a desired color. For example, the systems described herein that incorporate and/or utilize lookup tables or similar structures to store associations between parameters of hair and colors may be networked with other systems and utilize such networked information to improve hair dye compositions As is known, clients who desire a new hair color may have a particular target hair color in mind when entering a salon. However, it can sometimes be a challenge for a stylist to know how to change a client's current hair color into the desired color. Coloring hair is complicated, and in many cases it can be difficult to know the final color of a client's hair after applying a dye formulation. Furthermore, variations in one or more aspects or characteristics of the client's hair can impact how the hair dye composition changes the client's hair. For example, different clients' hair may react differently to the same hair dye compositions such that two clients whose hair starts at the same color may end up at different colors with the same hair dye compositions applied. Embodiments of the invention compare the characteristics of a client's hair to a large dataset of other prior coloring sessions to help formulate a dye composition that will properly allow the stylist to dye the client's hair to reach a target color. For example, the stylist may take a plurality of existing measurements of the client's hair to determine characteristics of the hair. Those measurements and characteristics, along with the target hair color may be input into the system. The system then can compare those starting measurements and characteristics, and the target color with a large dataset of prior coloring sessions to output a suggested protocol for allowing the client to reach the target color. The system may use artificial intelligence and machine learning processes to organize and analyze the prior client data and then run instructions to identify corresponding characteristics from the database of prior hair characteristics and use the information from the database with instructions to determine the proper protocols and composition to place on the client's hair to reach the target desired hair color.

In one embodiment, the stylist may use an electronic device for measuring a client's current hair color. The device may be a hand-held colorimeter, optical sensor, camera, narrow or broad frequency information capturing devices, or similar device that performs an analysis on the hair to return measured values of various characteristics of the hair, including hair health, color, type, density, thickness, porosity, gray coverage, damage, moisture level, previous treatments, and so forth levels of primary colors reflected by the hair. However, other devices that measure these characteristics of the client's hair are also contemplated. For example, the stylist may take a high-resolution photograph of the client's hair and perform an analysis of the color in the digital image in one embodiment. In another embodiment, the stylist may take a plurality of photos, or a video, and feed that data into the system for analysis of the client's current hair color. Once the starting characteristics for the client's existing hair are measured, and the stylist consults with the client about what the desired target color is, the stylist may enter the measured characteristics and the desired color into the system for comparison with a database of stored measured characteristics and generation of hair dye composition.

In one embodiment, the target hair color may be entered into the system by inputting the desired colors, hues, or other color information. In another embodiment, the desired target color may be captured by entering a Pantone (or similar) number or identifier into the system. In another embodiment, the target color may be captured from an existing photograph or image of a hair color printed in a magazine or other source. For example, the stylist may take a digital photograph of a hair color the client saw in a fashion magazine and the system may use that captured color as the target color so that the client may obtain the same color they saw in the magazine.

Using the captured hair characteristics, the system may access a centralized database or a number of distributed databases or storage devices to identify probable results for applying dye compositions to the client's hair given the captured hair characteristics. For example, the system may search the centralized or distributed databases for other clients having similar hair characteristics and coloring outcomes based on corresponding target colors and dye compositions to better determine the dye composition for the client with the captured hair characteristics to get to the target color.

Based on the obtained hair characteristics, the obtained database information, and target color information, the system may process that information to determine the appropriate process for changing the client's hair color. In some embodiments, the system will suggest a protocol involving a series of color applications that include different compositions and treatments for hair roots in comparison to the ends of the hair. In some embodiments, the system may suggest pre-lighting the hair with bleach as an initial step. The system guides the stylist through the process with suggested formulation and treatments so that the end result is the target desired hair color.

Once the stylist has applied the formulations and treatments suggested by the system, the stylist can take an "after" set of measurements with the handheld sensor, to determine how close client's new hair color is to the desired target color. The system may record this result and use the data gathered from the coloring session to update its processes and coloring calculations to provide colors and procedures to improve its accuracy in the future. For example, the results may be stored in the centralized database or in one of the distributed databases along with one or more of the client's hair characteristics and the target color to show how one or more of the hair characteristics affected the change from the client's initial hair color to an end hair color. These results may allow for the system to compensate for hair characteristics that may be particular to clients when generating the dye compositions to reach the target hair color. By making the results available to other systems (via the centralized database or the distributed databases), other systems may use the same information to improve generating dye compositions to compensate for one or more of the hair characteristics.

In some embodiments, the dye dispensing system 110 of FIG. 1 may represent a salon or similar establishment supported by one or more stylists to which one or more clients come for hair color services. As noted above and as described herein, the dye dispensing system 110 (for example, the salon) includes an apparatus used to accurately dispense dye compositions and/or formulations for application by a stylist to a client's hair. In some embodiments, each of the dye dispensing systems 110 may include a database or data storage in which data regarding clients and/or stylists specific to that system 110 (for example, the specific salon comprising the system 110). For example, the system 110 database (not shown) stores client profiles and include historic hair characteristics and hair colorings. For example, the system 110 database includes a client profile for each client that has visited the salon or used the system 110. In some embodiments, the client profile includes an identifier for the client (for example, the client's name, phone number, and so forth) and details of previously measured or provided hair characteristics (for example, one or more of hair health, color, type, density, thickness, porosity, gray coverage, damage, moisture level, previous treatments, levels of primary colors reflected by the hair, and so forth). In some embodiments, the client profile also includes details of previous hair coloring sessions, including initial starting hair color, desired target hair color, end hair color, and/or details regarding the dye composition and/or formulation applied to the client's hair to transition it from the initial hair color to the end color. In some embodiments, This data stored in or associated with the client's profile can be used to improve future coloring sessions for the client's hair because previous results and hair characteristics can be analyzed to identify changes to make in the future coloring sessions to ensure that the end color is close to the target hair color, thereby improving future results for the client (and, thus, the stylist and salon).

In some embodiments, the data store in the system 110 database associated with each client profile is also used in aggregate. For example, the data for each client may be anonymized and used to improve colorings for clients sharing one or more of the initial hair color, target hair color, or one more hair characteristics as another client of the system 110. For example, a previous client with an initial hair color having a first color (and/or lightness) value and desired a target hair color having a second color value ended up with an end hair color having a third color value having had a first dye formulation applied to the client's hair. A stylist who has subsequent client having an initial hair color of the same first color value and a desired target hair color having the same second color value may adjust the dye formulation to help ensure that the end color is close to the target color. The adjustments to make to the dye formulation may be informed by the results from previous clients as well as any similarities and/or differences in hair characteristics between the previous clients and subsequent clients. For example, if both the previous and subsequent clients have hair that is porous and the previous client's end hair color was darker than the target color, the stylist may identify that the subsequent client's hair may absorb extra color (due to the similar porosity) and adjust the subsequent dye formulation to include less color to try to get closer to the target color. Similarly, other similarities or differences of hair characteristics may inform how or whether the stylist adjusts the dye formulation.

By using the hair characteristics of all clients of the system 110 in aggregate, the stylist (and/or system 110) may use large data sets to direct and/or inform dye formulations. By aggregating and/or analyzing the large data sets and using machine learning or artificial intelligence processes, the system 110 may improve the results of dye formulation application to clients' hair by incorporating previous results and hair characteristics that led to the previous results, and improving through feedback and back propagation loops over time. As more and more information is available for aggregation and analysis, the improvements to dye formulations should bring the target hair color and end hair color closer together.

Figure 6:
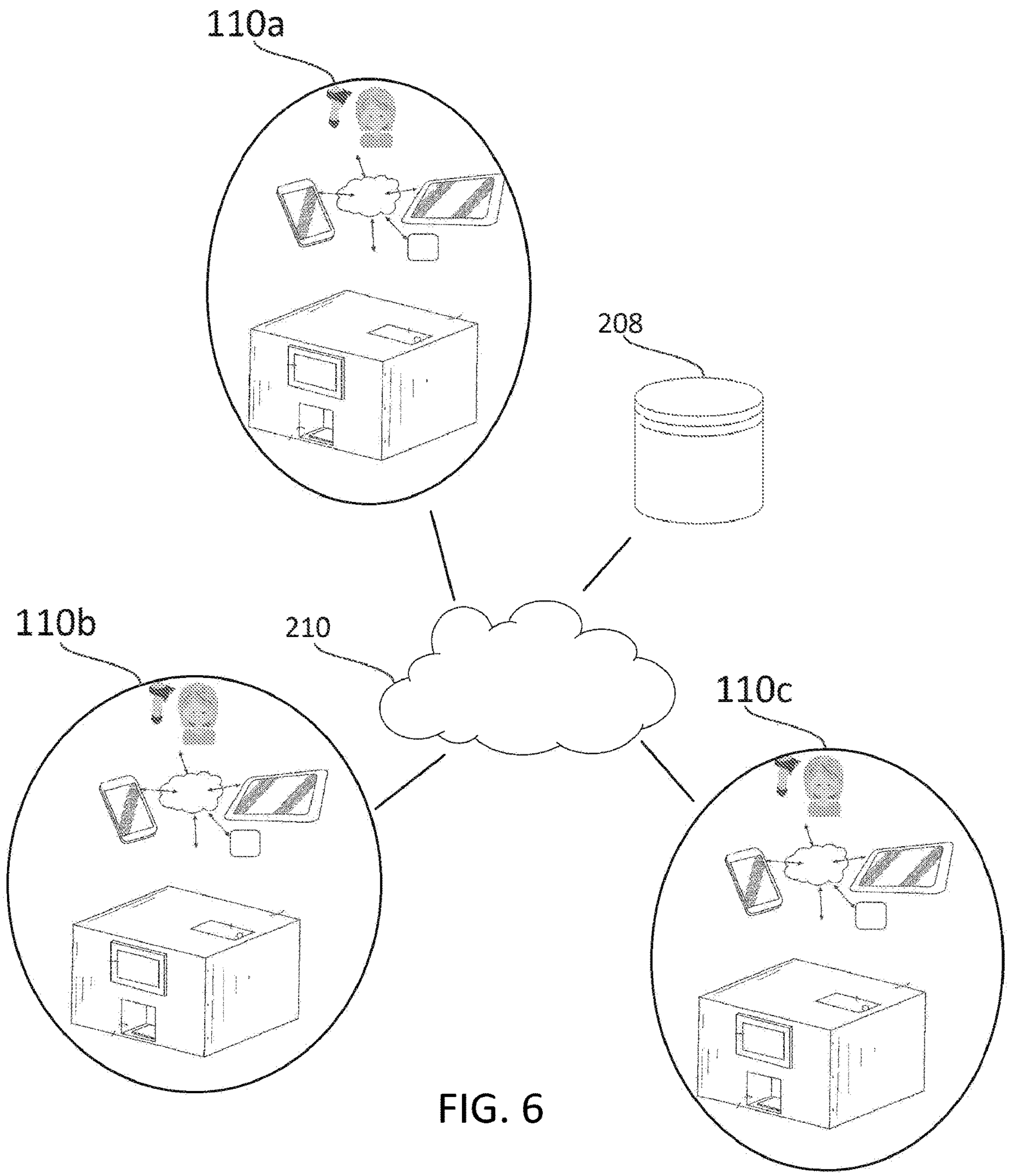
FIG. 6 is a networked diagram of a plurality of dye dispensing system environments of FIG. 1, in accordance with an exemplary embodiment.

FIG. 6 is a networked diagram of a plurality of dye dispensing system 110 environments of FIG. 1, in accordance with an exemplary embodiment. As described above, the dye dispensing system 110 environment of FIG. 1 may correspond to or represent a salon or other establishment where clients work with stylists to color the clients' hair. Furthermore, these individual salons or systems 110 may be networked themselves to allow communication of information between different salons or systems 110. As shown in FIG. 6, three systems 110 may be networked together via a network 210. Each of the first system 110*a*, the second system 110*b*, and the third system 110*c* may comprise the apparatus 100 and one or more mobile devices, etc., that are networked locally (for example, within the system 110 or salon) as described with reference to FIG. 1. Furthermore, the network 210 may connect the systems 110*a*-110*c* to a networked database 208. In some embodiments, the networked database 208 may operate as a centralized database where information (for example, hair characteristics from clients of each of the systems 110*a*-110*c*, initial, target, and end hair colors from coloring sessions, corresponding aspects that could impact coloring results, and so forth) are stored in a common, anonymized format. In some embodiments, the networked database 208 may also store client profiles to allow clients to travel to any of the systems 110*a*-110*c* to receive hair coloring services that are customized based on previous visits.

As described above, hair characteristics of all clients of a single system 110 may be instructive and/or informative on adjusting dye formulations for future clients based on similarities in one or more of initial hair color, target hair color, and one or more hair characteristics. By aggregating the client information from multiple systems 110 in the networked database 208, each of the networked systems 110*a*-110*c* may have access to more information that the systems 110*a*-110*c* are able to further improve adjustments to dye formulations to better ensure that the end color from a coloring session is as close as possible to the client's target color. As more and more systems 110 are networked with the networked database 208 and store client hair characteristics and coloring session results (for example, initial, target, and end hair colors) in the networked database 208, the networked systems 110 have an improved resource to use when preparing dye formulations for future clients by utilizing the client's hair characteristics, initial hair color, and target hair color in conjunction with information stored in the networked database 208 and analytics, models, and so forth to better inform dye formulation such that the end color is closer or as close to the target color as possible.

In some embodiments, the networked database 208 (or distributed storage devices, for example distributed in each system 110 but networked for access by all networked systems 110) may store the information captured from the scanners 111 of each system 110 as well as any manual or other inputs. The information in the networked database 208 (or distributed devices) may be utilized by one or more remote data modules (described in further detail herein) to compute the most probable results of coloring sessions using inputs from the scanner 111. In some embodiments, the scanner 111 and the color analysis module 216 generate and/or utilize a database of hair characteristics and/or a library of hair values (for example, the lookup table of hair lightness values described herein or other hair characteristics and so forth). The library or database may include details regarding how hair characteristics impacted the hair coloring process, as described in further detail herein.

Using such a lookup table as described above, the color analysis module 216 may identify a color of a scanned client's hair (scanned via the scanner 111) or of a scanned swatch or sample using the data in the lookup table. For example, the stylist (or the client) scans the client's hair at three (or more, or fewer) different locations to identify various hair characteristics measurements associated with the client's hair. The three locations may include a root location of the client's hair, a shaft location on the client's hair, and a tip location of the client's hair. The measurements from the scanner 111 may be conveyed to the computing system 200. The color analysis module 216 may identify a single lightness and/or color values that correspond to all three measurements of the client's hair. For example, the color analysis module 216 (or the scanner 111) averages the lightness and/or color measurements from the three measurement locations to generate the single lightness and/or color measurement. In some embodiments, the color analysis module 216 (or the scanner 111) generates a median value for the three lightness and/or color measurements as the single lightness and/or color measurement. In some embodiments, other calculations are used to determine the single lightness and/or color measurement. In some embodiments, the three lightness and/or color measurement values and the single lightness and/or color measurement are stored in the mass storage device 222 or the network storage.

Based on the determined single measurement, the color analysis module 216 references the lookup table to identify the hair color level (for example, the name, identifier, and so forth) associated with the single measurement based on the single measurement falling between the minimum and maximum levels for a particular hair color. For example, the color analysis module 216 identifies that the single measurement is L=34, the color analysis module 216 references the lookup table to identify the hair color level for which L=34 falls between the corresponding minimum and maximum measurements. If the color 8 has a maximum L value of 35 and a minimum L value of 30, then the color analysis module 216 identifies that the client's hair color level corresponds to color level 8. In some embodiments, the color analysis module 216 may calculate an exact hair color level based on a relationship between the single measurement and the minimum/maximum levels. For example, the single measurement of L=34 with the minimum and maximum L values being 30 and 35, respectively, the color analysis module 216 may determine that the client's hair color level is 8.8 (the 30 getting to color level 8 and then the 4/5 getting to color level 0.8). The color analysis module 216 may round the 8.8 color level to the nearest whole (9) or half (8.5) color level. In some embodiments, the color analysis module 216 provides the identified color level for display to the client or the stylist via the UI of the computing system 200. The identified color level may also, or alternatively, stored with the client's profile or in the mass storage device 222 or the network storage. In some embodiments, a name or image of the color corresponding to the color level may be displayed via the UI for visual confirmation by the client and/or the stylist.

Alternatively, instead of determining the single measurement that corresponds to the three measurements from the client's hair, the color analysis module 216 may identify colors, from the lookup table, corresponding to the measurements from the three measurement locations. Accordingly, the color analysis module 216 may identify up to three different color levels (or more color levels if more than three measurements are taken from the client's hair) depending on how different the measurements are from each other for each measurement location.

Embodiments of the inventions described herein further relate to systems and methods for identifying a dye formulation for a client based on a desired hair color and then displaying an image or representations of a predicted hair color to the client based on the identified formulation. As is known, clients who desire a new hair color may have a particular target hair color in mind. In some case, clients may bring a sample hair color to a stylist and ask the stylist to create a hair coloring protocol and dye formulation that will result in their hair matching the sample hair color. However, it can sometimes be a challenge for a stylist to show to the client what a desired recipe or formulation will look like as applied to the client's hair and make adjustments in real time, or near real time, to adjust the dye formulation and show the results of the adjustments to the client. One embodiment of the invention is a system for displaying a hair color to a client that is likely to be the results of dying the client's hair with a particular formulation. By modifying the particular formulation on a display device, the stylist may show the client a variety of different hair colors as they would appear on the client's hair after treatment. In one embodiment, the target hair color may come from measuring a target hair color from a printed or digital color sample, and then creating a protocol and dye formulation for matching a client's hair color to the color sample.

In some embodiments of the invention, the system includes a device for inputting the target hair color and then measuring the client's current hair measurements regarding for example one or more of the color tone, texture, and other hair characteristics. The system may then run instructions to (1) determine the proper protocols and dye composition and/or formulation to place on the client's hair to reach the target desired hair color from the initial hair color and/or (2) show a predicted end hair color given a dye formulation and an input hair color.

In one embodiment, the predicted end hair color may be shown on a screen of an electronic device configured to show the predicted end hair color in conjunction with the client's hair, face, and/or body. For example, the client may want to use a particular dye formulation previously used by a friend or someone who referred the stylist to the client (or family member, and so forth). In such an embodiment, the stylist may be able to capture a picture of the client and then superimpose the end color that is expected based on the dye formulation and the client's starting hair color. In some embodiments, the electronic device determines the proper dye composition and/or formulation for the client to reach a desired target color from the client's initial hair color.

In another embodiment, the client may bring in a picture or image that includes the target hair color and the stylist may use a device (for example, a handheld scanner or similar device) to scan the picture or hair color from the picture to identify the target color and generate a formulation that would result in the target hair color on the client's own hair. Because each client's hair has its own characteristics of color, health, etc. the dye formulation used for each client to reach the same target hair color may be different. Thus, the system may input all of the variables from the client's own hair and calculate and display the predicted hair color on an electronic display so the client may confirm that the final look and color of the hair is their desired look. In one embodiment, the stylist may take a digital image of the client, and the system may identify the portions of the image that are hair, and alter the hair color according to various formulations determined by the system, or input by the stylist, to display the final look of the dyed hair color to the client.

In one embodiment, the device used to measure the client's existing or target hair color may a colorimeter. In other embodiments the device used to measure the client's existing or target hair color is a digital camera. However, other devices that measure the client's hair color are also contemplated. For example, the stylist may take a high-resolution photograph of the client's hair posed adjacent to a printout or chart of a standard set of colors that are known to the system and perform an analysis of the client's hair color in the digital image in one embodiment.

In some embodiments, the color analysis module 216 (for example, as described above) may provide analysis and outputs in various embodiments. For example, the color analysis module 216 may provide an output when a client or a stylist has a formula for a hair dye composition or formulation that they would like to use but when they do not know what the final color would look like when mixed. In such embodiments, where the dye formulation is entered into the system 110 (for example, via the UI or similar I/O devices and interfaces 212, the color analysis module 216 may determine, input or read what hair color, texture, and so forth, the entered dye formulation would be applied to and then display the resulting hair color, texture, and so forth on a display of one of the mobile devices 112 (for example, via the UI or I/O devices and interfaces 212). In some embodiments, the color analysis module 216 applies the determined hair color, texture, and so forth to an image of the client so that the client can see what the result of the dye formulation is expected to look on the client's own hair specifically. Accordingly, the color analysis module 216 may allow for the stylist and the client to see the expected end hair color and so forth before beginning the hair transformation process.

Additionally, or alternatively, the color analysis module 216 may provide results where the client has a desired hair color, the results comprising what specific dye ingredients should be mixed to get there (for example, where the color analysis module generates the dye formulation based on the desired hair color). In some embodiments, the color analysis module 216 may work in conjunction with the formulation module 218, as described in further detail herein.

In generating the hair color for display based on a provided dye formulation, the color analysis module 216 may perform multiple steps, some in conjunction with other components of the computing system 200 and/or the system 110. For example, the color analysis module 216 (or an external component) may create and/or access a library of spectral signatures for all colors of a specific hair color line or brand or for many color lines or brands. In some embodiments, when creating the library (for example, for all base colors, natural colors, and pure tones for a particular color brand or line), the scanner 111 and the color analysis module 216 generate a library of spectral values based on measurements of samples scanned using the scanner 111 and/or a spectrophotometer. In some embodiments, the samples measured may comprise dyes applied in full concentrations to International Organization for Standardization (ISO) wool cloth for 30 minutes prior to measurement. In some embodiments, the samples measured have different dye concentrations, mediums (for example, human hair, natural cloth fabrics, synthetic cloth fabrics, animal hair, and so forth), or set times. In some embodiments, the spectral measurements may comprise measurements of spectral signature and/or XYZ color of the dye or CIELAB values (for example, lightness and/or color values). The measured values are stored in the library, for example in the mass storage device 222 or on a local or networked database (not shown) along with a name or other identifier for the corresponding dye or color. This process may be repeated for all colors in the color brand or line and/or for many or all color brands or lines; as such, the resulting library may comprise a large database of colors and color information. The measurements stored in the color spectral library may comprise wavelengths, and so forth, associated with the particular color names.

Once the library exists, the stylist and/or the client may enter the desired or known formula into the computing system 200. For example, the desired or known formula may be manually typed in via the I/O devices or interfaces 212 or the UI or selected from a list of existing formulas, and so forth. In some embodiments, the desired or known formula may be scanned in from another document or barcode, and so forth. For example, the desired or known formula may be 40 g 6N and 60 g RO. The known formula comprises gram weights for two different colors or components of the known dye formulation. The first gram weight is 40 g and the second gram weight is 60 g.

The color analysis module 216 may convert the gram weights of the known formula to concentrations. The concentration may comprise a dyebath relative concentration. Calculating the concentration comprises calculating parts of a whole for each of the identified colors. The color analysis module 216 may sum both gram weights (40 g+60 g=100 g) and then divide each gram weight by the sum (40 g/100 g=0.4 and 60 g/100 g=0.6). Thus, the concentrations C1 and C2 are 0.4 and 0.6, respectively. Depending on the known formula, there may be N concentrations solved for by the color analysis module 216.

Once the concentrations C1 and C2 are known, the color analysis module 216 reviews the color spectral library based on the color inputs, 6N and RO. For example, 6N and RO may represent colors by one or more color brands or lines that have information stored in the color spectral library. In some embodiments, the color spectral library may operate as a lookup table, where the color analysis module 216 may lookup known color inputs in the spectral library. As described above, the measurements stored in the color spectral library may comprise wavelengths, and so forth, associated with particular color names. In some embodiments, the color spectral library includes color spectral signatures defined as R (in units of wavelength, or nm). The R value may correspond to a reflectance value (for example, color reflectance) for an opaque (infinite "optical thickness") material. Thus, based on the two color inputs, 6N and RO, the color analysis module 216 identifies to R values, R1 and R2, respectively. For the known formula having N colors and concentrations, N R values may be identified from the spectral color library.

The color analysis module 216 may convert the identified spectral signatures R1 and R2 to a constant. In some embodiments, the color analysis module 216 may convert the identified spectral signatures R1 and R2 into values representing absorption over scattering, F, according to Equation #1:

$$F=(1-R)2/2*R \quad \text{EQUATION \#1}$$

Since there are two R values (R1 and R2) in the known formula, there are two F values (one for each R value). Thus, based on Equation #1 the color analysis module 216 generates two F value, F1 and F2. As noted above, if N colors are included in the known formula, the color analysis module 216 may generate N F values based on the N R values, and so forth. Based on the determined concentrations and the F values, the color analysis module 216 may generate a visual color for the known formula. For example, the color analysis module 216 may multiple each concentration C1 and C2 by its corresponding F1 and F2 (F spectra) value, summing the results for the entirety of the known formula. For the example known formula 40 g 6N and 60 g RO provided above, the color analysis module 216 generates a summed FMixed value based on Equation #2:

$$F\text{Mixed}=C1*F1+C2*F2 \quad \text{EQUATION \#2}$$

If N term exist in the known formula, then the FMixed value will multiple and sum the C and F values for all N terms.

The color analysis module 216 then converts the FMixed result back to a reflectance spectral signature by Equation #3.

$$R\text{Mixed}=1-F\text{Mixed}-(2*F\text{Mixed}+F\text{Mixed}2)^{1/2} \quad \text{EQUATION \#3}$$

The color analysis module 216 may then convert the RMixed spectral signature to an RGB color via one or more generally understood methods of conversion. The color analysis module 216 may convey the generated RGB color for display on the UI or presentation to the client and/or stylist. In some embodiments, the RGB color is displayed on the UI (for example, on an image of the client) so that the client can see what the known formula is expected to look like on the client. In some embodiments, the client and/or the stylist may adjust aspects of the known formula (for example, one or more of the gram weights or the colors identified) to change the end predicted color as desired. In some embodiments, the color analysis module 216 recalculates any changes to provide an updated image on the UI, and so forth, so the client and/or the stylist are able to see the adjustments made to the known formula. This process can be repeated for any adjustments made to the known formula.

In some embodiments, the color analysis module 216 may face special circumstances for particular colors in the spectral library. For example, in some known formulas, one or more of the concentrations and/or colors are ignored when calculating the FMixed and RMixed values. For example, if the known formula includes one or both of 00N and 12N color amounts, the color analysis module 216 may calculate concentrations differently than as described above. For example, the color analysis module 216 generating a visual color based on known formulas including either 00N or 12N colors may ignore the 00N or 12N terms. Thus, the color analysis module 216 may calculate the concentration of the known equation 40 g 6N with 60 g 00N ignoring the spectral signature of the 00N term while treating the remaining colors term(s) as described above. Thus, for the known formula 40 g 6N and 60 g 00N, C1=40 g/100 g=0.4 and FMixed=C1*F1.

With regard to converting a desired color to the proper dye formulation or formula, the color analysis module 216 may use the color spectral library described above. For example, based on all the colors and measurement (for example, spectral and so forth) information stored in the color spectral library, the color analysis module 216 (or an external component) creates a large database of virtual mixes. For example, color analysis module 216 or other component may create the virtual mixture database (which may be stored in the mass storage device 222 or on the external or networked database based on running all combinations (for example, of up to four colors) of colors and concentrations possible in the color spectral library. In some embodiments, the number of colors in the combinations may be limited to three colors or five colors or any other number of colors. Once the virtual mixture database is created to include the formulas that are generally possible given the color information in the color spectral database. The color analysis module 216 may find the closest match formula in the virtual mixture database to the desired color (for example, as scanned with the scanner 111 or other optical scanner) by comparing the desired color to the colors in the virtual mixture database and identifying the formula from the closest color match. In some embodiments, the match is calculated via a delta E CMC color difference equation.

Thus, the color analysis module 216 may identify the mixture in the virtual mixture database having the closest DECMC to the desired color. The identified mixture may then be displayed on the UI or output to the formulation module 218. In some embodiments, the client and/or the stylist may make adjustments to the identified mixture and formula and any changes may be updated in real-time to show the expected end color based on the changes.

The color analysis module 216 thus provides more precise, quicker results of color and/or formulation determination that avoids problems of mathematically predicting oxidative hair color mixes and trial and error in the salon.

Embodiments of the invention relate to systems and methods for preparing a coloring service, having an appropriate amount and formulation of dye to be dispensed for the coloring service, and applying the dye formulation to a client's hair to facilitate the color application process. In some embodiments, identifying the dye formulation for the client's coloring service is based on a desired hair color and/or a known dye formulation and an initial hair color for the client. In some embodiments, hair characteristics of the client's hair are obtained and used in generating the client's hair coloring service. As is known, clients who desire a new hair color may have a particular target hair color in mind. In some case, clients may bring a sample hair color to a stylist and ask the stylist to create a hair coloring protocol and dye formulation that will result in their hair matching the sample hair color. However, it can sometimes be a challenge for a stylist to manually generate, dispense, and apply the dye formulation to the client's hair to obtain the target hair color without or with minimal trial and error. The methods and systems described herein allow for adjustments in real time, or near real time, to adjust the dye formulation and show the results of the adjustments to the client. One embodiment of the invention is a system that provides for displaying a hair color to a client that is likely to be the results of dying the client's hair with a particular formulation.

In some embodiments of the invention, the system includes a device for inputting the target hair color and then measuring the client's current hair measurements regarding for example one or more of the color tone, texture, and other hair characteristics. The system may then run instructions to (1) determine the proper protocols and dye composition and/or formulation to place on the client's hair to reach the target desired hair color from the initial hair color and/or (2) dispense the dye composition and/or formulation and/or (3) provide instructions and/or facilitate application of the dye composition and/or formulation to the client's hair.

In some embodiments, the instructions help the stylist manage the steps, times, techniques, and so forth of the color application to the client's hair.

In another embodiment, the client may bring in a picture or image that includes the target hair color and the stylist may use a device (for example, a handheld scanner or similar device) to scan the picture or hair color from the picture to identify the target color and generate a formulation that would result in the target hair color on the client's own hair. Because each client's hair has its own characteristics of color, health, etc. the dye formulation used for each client to reach the same target hair color may be different. Thus, the system may input all of the variables from the client's own hair and calculate and generate the proper dye formulation for application to the client's hair.

In one embodiment, the device used to measure the client's existing or target hair color may be a colorimeter. In other embodiments, the device used to measure the client's existing or target hair color is a digital camera. However, other devices that measure the client's hair color are also contemplated. For example, the stylist may take a high-resolution photograph of the client's hair posed adjacent to a printout or chart of a standard set of colors that are known to the system and perform an analysis of the client's hair color in the digital image in one embodiment.

The color analysis module may provide analysis and outputs in various embodiments. For example, the color analysis module 216 may provide an output when a client or a stylist has a formula for a hair dye composition or formulation that they would like to use but when they do not know what the final color would look like when mixed. In such embodiments, where the dye formulation is entered into the system 110 (for example, via the UI or similar I/O devices and interfaces 212, the color analysis module 216 may determine, input or read what hair color, texture, and so forth, the entered dye formulation would be applied to and then display the resulting hair color, texture, and so forth on a display of one of the mobile devices 112 (for example, via the UI or I/O devices and interfaces 212). In some embodiments, the color analysis module 216 applies the determined hair color, texture, and so forth to an image of the client so that the client can see what the result of the dye formulation is expected to look on the client's own hair specifically. Accordingly, the color analysis module 216 may allow for the stylist and the client to see the expected end hair color and so forth before beginning the hair transformation process.

Additionally, or alternatively, the color analysis module 216 may provide results where the client has a desired hair color, the results comprising what specific dye ingredients should be mixed to get there (for example, where the color analysis module generates the dye formulation based on the desired hair color). In some embodiments, the color analysis module 216 may work in conjunction with the formulation module 218, as described in further detail herein.

The color analysis module 216 provides more precise, quicker results of color and/or formulation determination that avoids problems of mathematically predicting oxidative hair color mixes and trial and error in the salon.

In some embodiments, one or more of the devices 112 used by the stylist and/or the client may have thereon an application that automates the hair coloring service. In some embodiments, the one or more mobile devices 112 may comprise one or more of a mobile phone, a tablet or a personal computer. The application may include a plurality of different components or functions, including a client record keeping system, a laboratory for design colors, and client applications and a dispenser/apparatus management tool.

Figure 7:
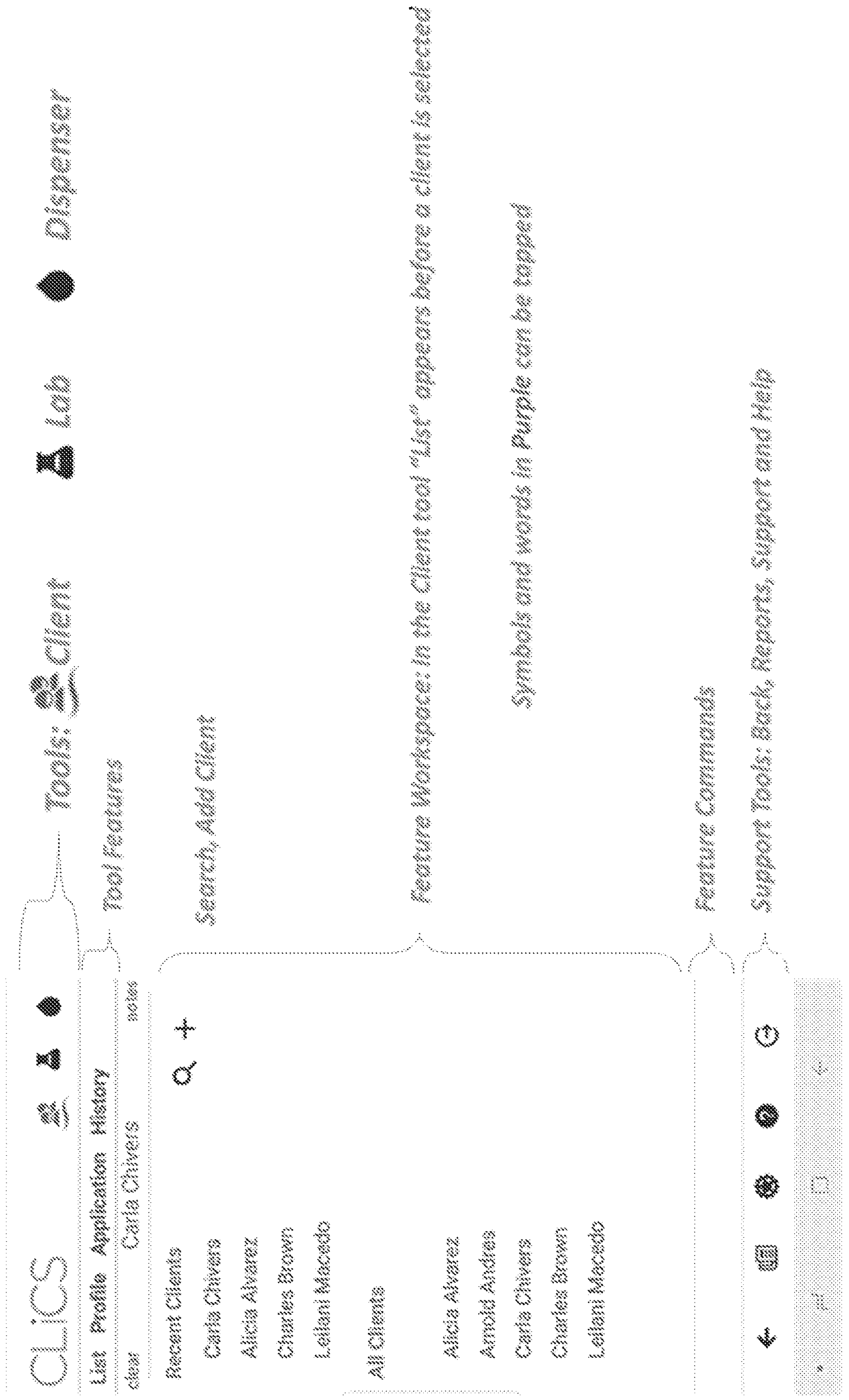
FIG. 7 is a screenshot of a client record keeping system showing an exemplary client list view of an application that automates hair-coloring services.

FIG. 7 is a screenshot of a client record keeping system showing an exemplary client list view of the application that automates hair coloring services. This screen of the application shows a listing of recent clients and all clients and provides for additions of new clients or other functions of the application (lab and/or dispenser/apparatus) can be selected. The application provides for selection of client profiles, hair color applications, and/or histories of clients.

Figure 8:
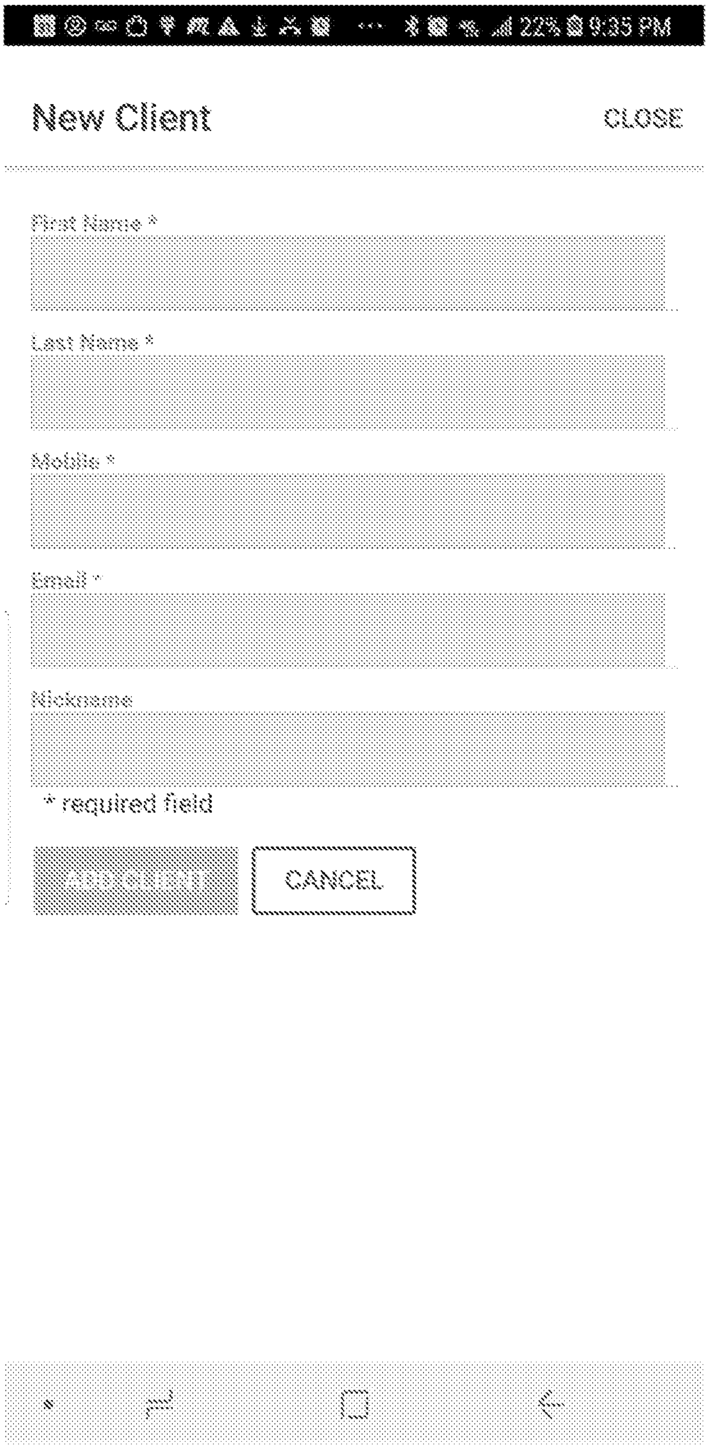
FIG. 8 is a screen shot of a new client information input screen, for example accessed via the screen shown in FIG. 7.

FIG. 8 is a screen shot of a new client information input screen, for example accessed via the screen shown in FIG. 7. This screen provides for the first step in the service process, which begins by establishing a client record containing the name and contact information for a given new client. The information entered via the screen shown in FIG. 8 may be stored by the application in a local database or a remote (or networked) database.

Figure 9:
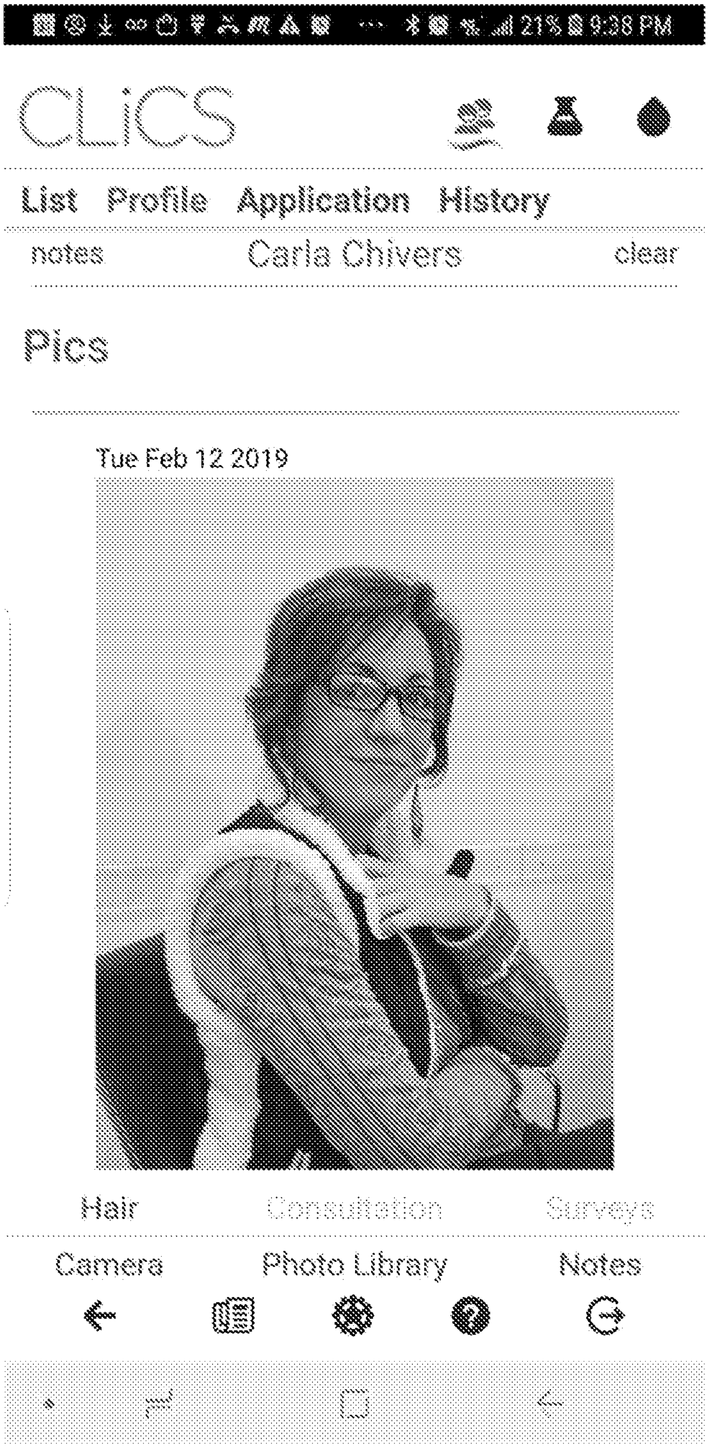
FIGS. 9-11 show screen shots of screens for generating and/or updating a hair profile and consultation information for a client.
Figure 10:
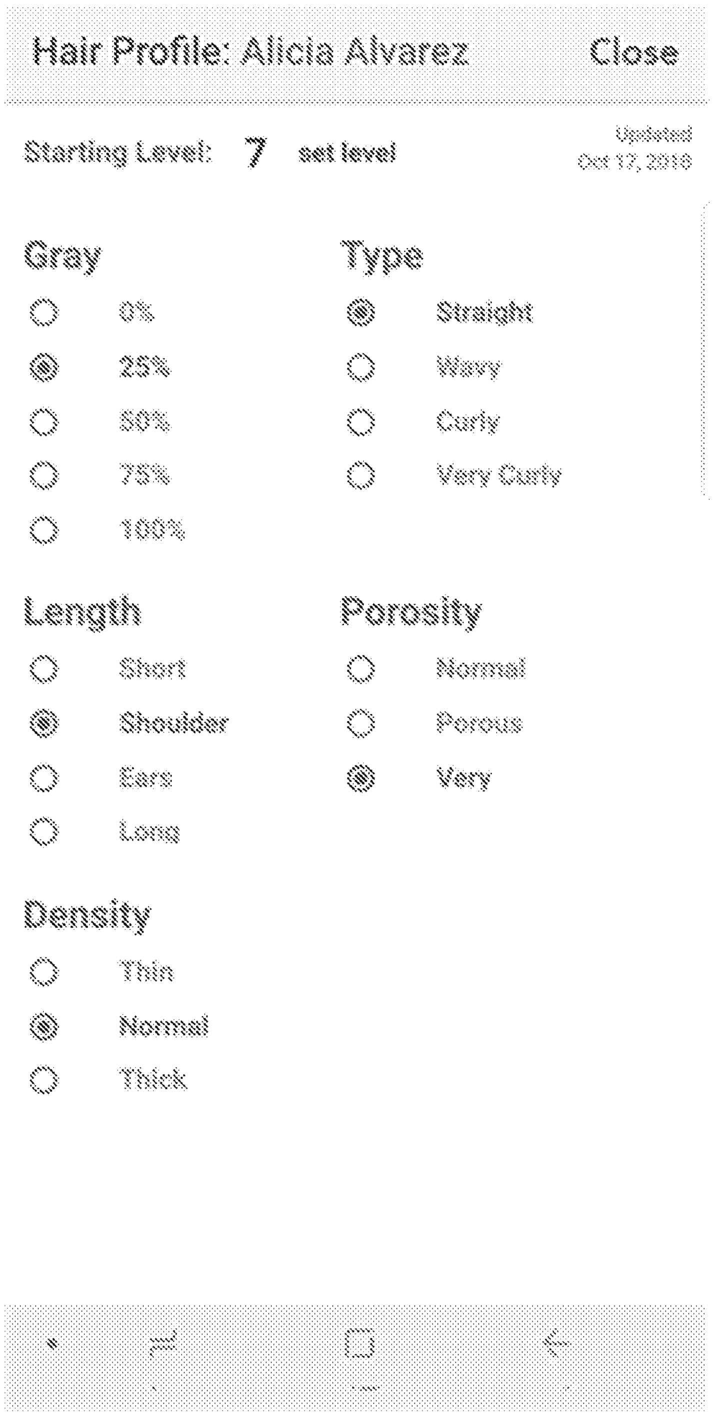
Figure 11:
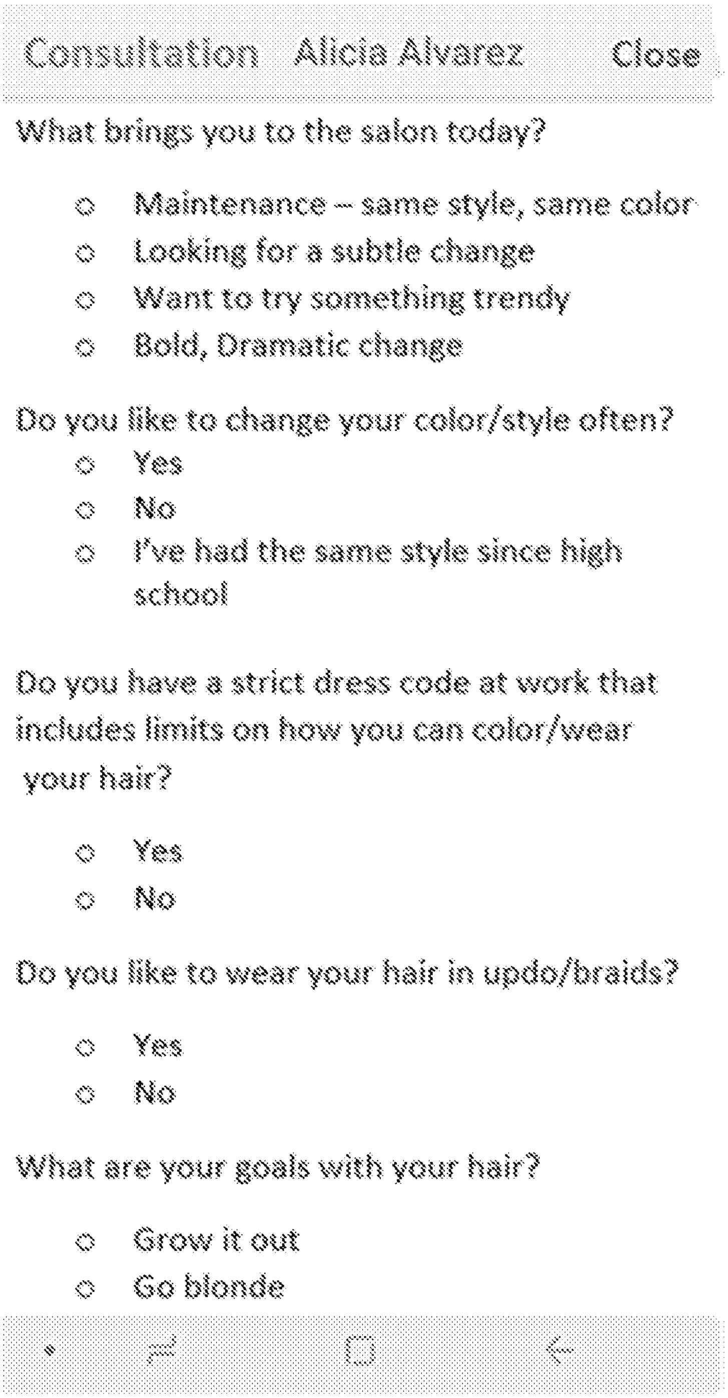
Figure 12:
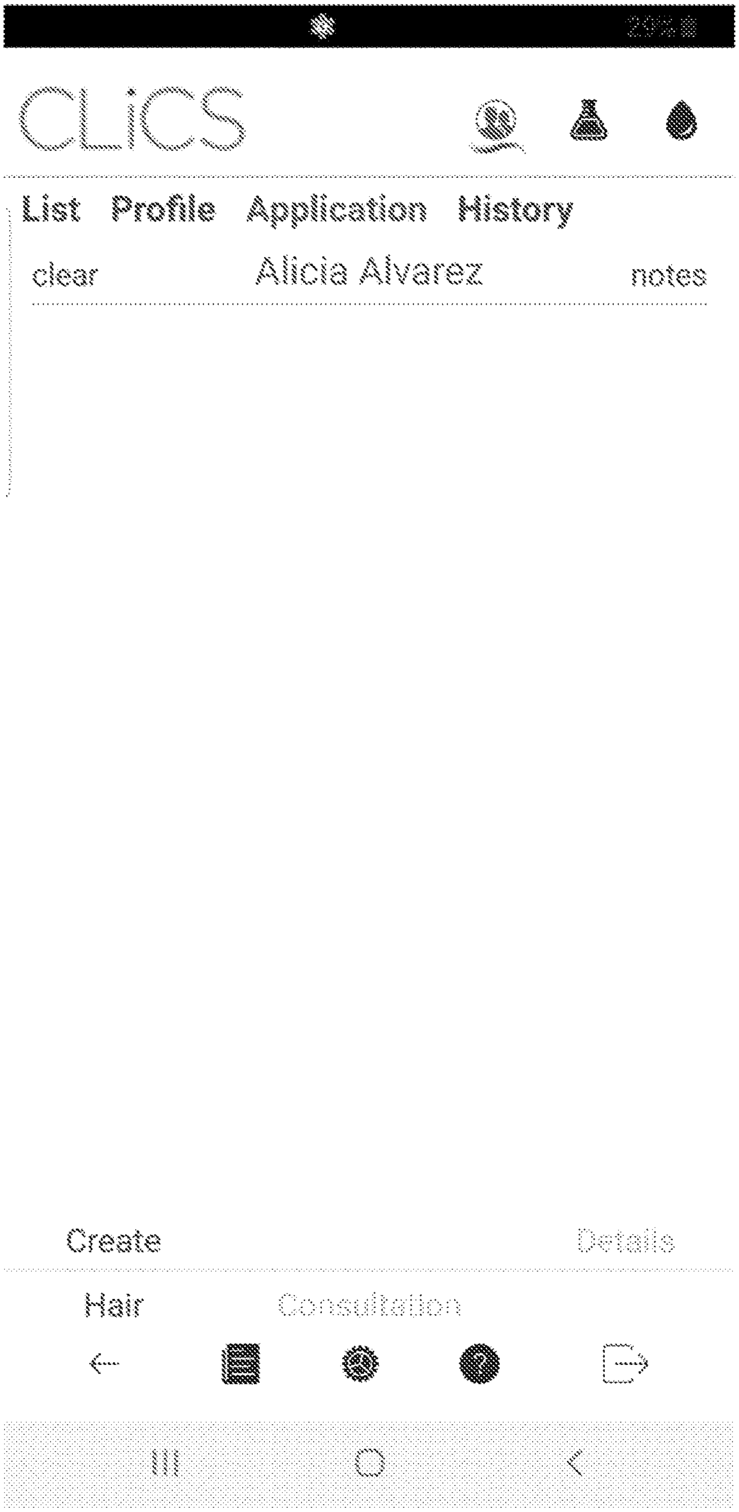
FIGS. 12-16 show screen shots of screens for generating or preparing a color application for the client.

FIGS. 9-11 show screenshots of input screens for generating and/or updating a hair profile and consultation information for a client. For example, FIG. 9 shows that a profile tool within the application provides one or more templates for capturing and/or recording a client's hair profile and generating consultation information. The profile tool may save any captured images or videos in association with the client's profile and retain any images taken of the client and their current hair style and color. FIG. 10 shows how different features or aspects and/or characteristics (including length, density, porosity, type, and gray percentage, whether the hair has been previously colored) of the client's hair can be stored in association with the hair profile. In some embodiments, the information used to populate the client's hair profile as seen in FIG. 10 is obtained from visual observations made by the stylist and/or from a sensor device such as a camera, optical, or other sensor. This information may be used to determine a starting level or color for the client's hair, which may also be stored in the hair profile using the sensor device linked to the application via a wired or wireless connection. FIG. 11 shows how different information regarding the client's visit can be entered into the client's profile via a consultation information template.

Figure 13:
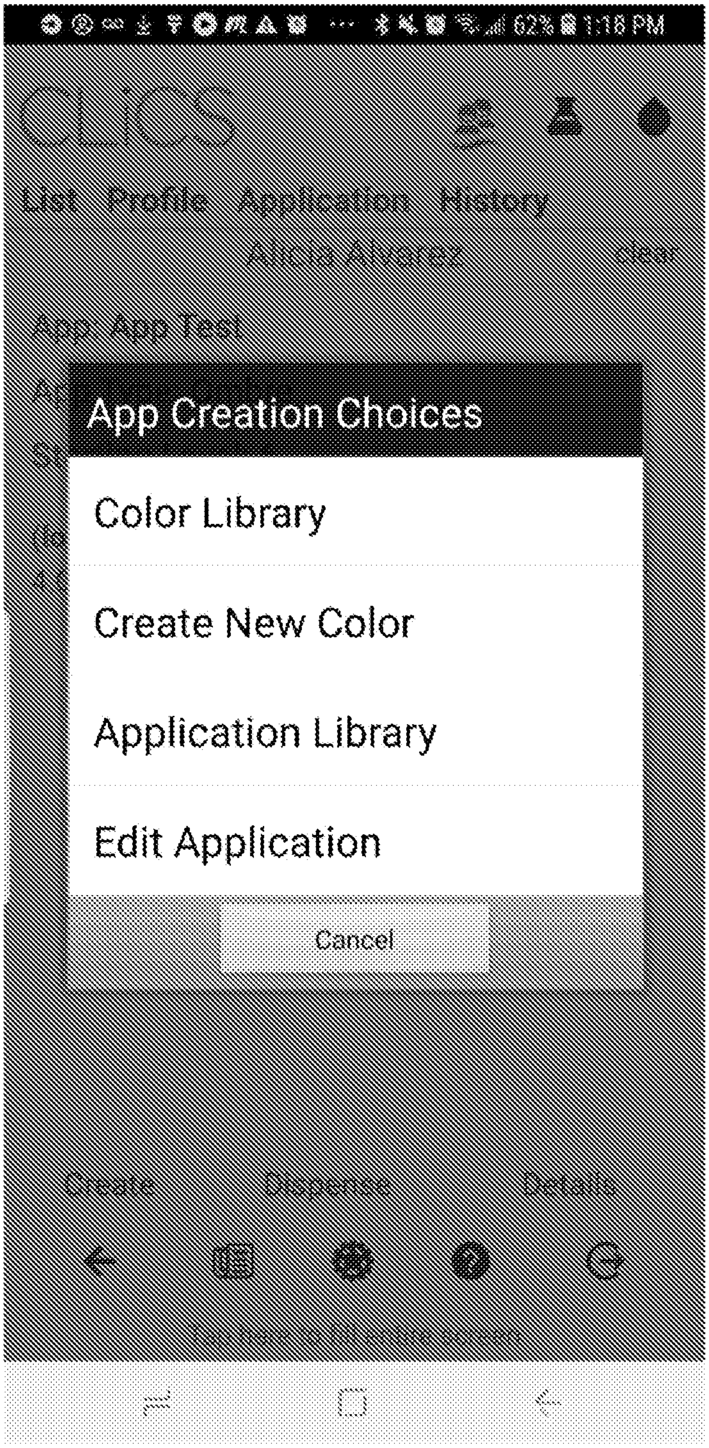
Figure 14:
Figure 15:
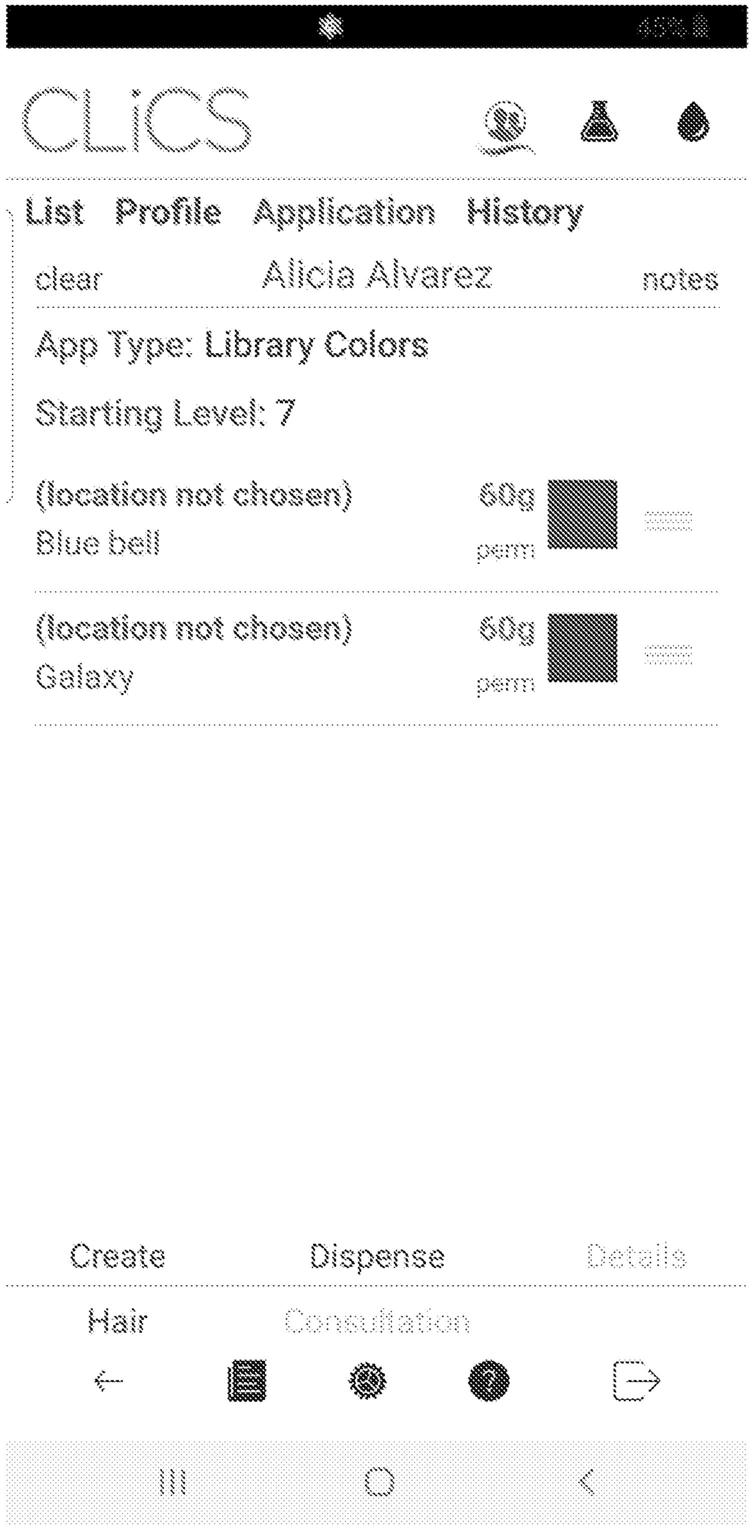
Figure 16:
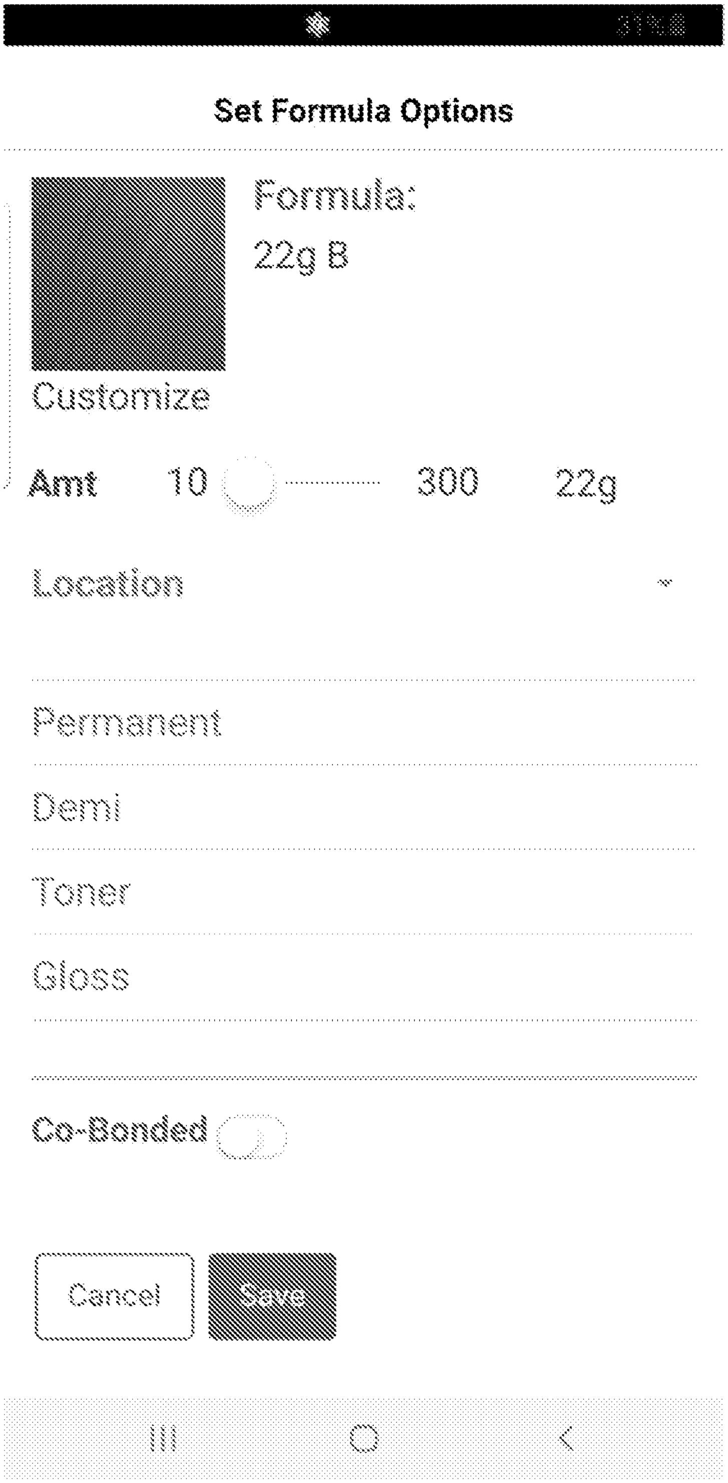

FIG. 12-16 show screenshots of input screens for generating or preparing a color application for the client. The color application design process may begin by tapping the "Create" command on FIG. 12. FIG. 13 shows a menu that appears after tapping "Create", the menu providing the stylist with four options including selecting one or more color formulas from a color library, designing a custom color in the lab (for example, based on a scanned, desired color, and so forth), creating a new application, or editing an editing an existing Application that may have been imported into and/or selected in the color application workspace associated with one or more clients, either from an application library or a client's history. FIG. 14 shows how, in some embodiments, the color library stores previously designed color formulas and allows the stylist (or another stylist or client) to select one or more colors and move them into the client application workspace with selection of the "Use" command. FIG. 15 shows how the selected colors or library colors are displayed for each of the color formulas in the client application workspace. The stylist or client can rearrange the sequence of the color steps (i.e., the colors shown in the order presented top to bottom) by touching, holding and dragging the step using the icon with the three lines next to the color image of the formula for that step. In some embodiments, a client application, no matter how simple or complex, includes one or more steps, and each step has a common set of elements or protocols. The elements may include 1) a formula that will be applied to the hair, 2) an amount of that formula, 3) a location where that formula will be applied to the hair, 4) a coverage, either a) Permanent, b) Demi-Permanent, c) Toner, d) Gloss, or e) Semi-Permanent, and 5) one or more additives such as a Co-Bonder, as shown in FIG. 16. In some embodiments, the client application may be organized into such a set of one or more steps.

Figure 17:
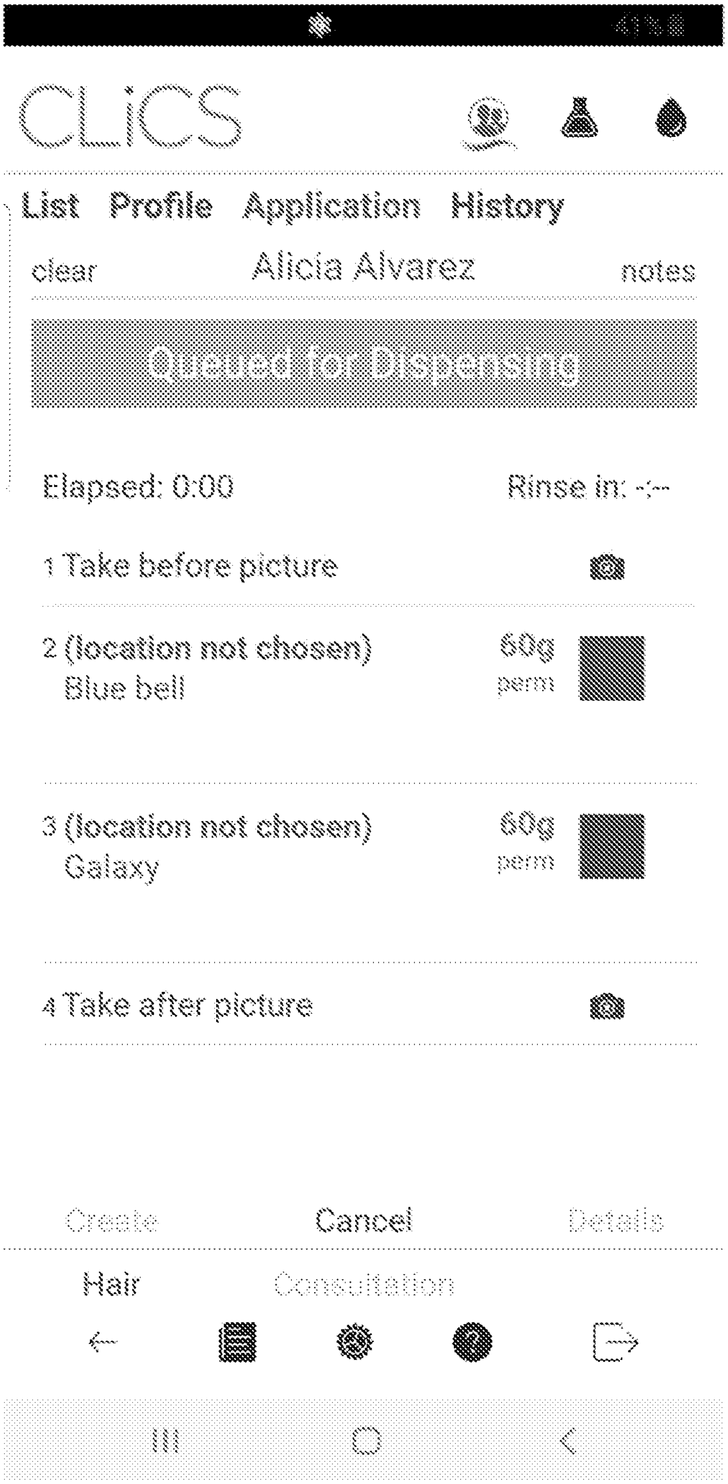
FIGS. 17-19 show screen shots of screens for tracking dispensing of the color application for the client.
Figure 18:
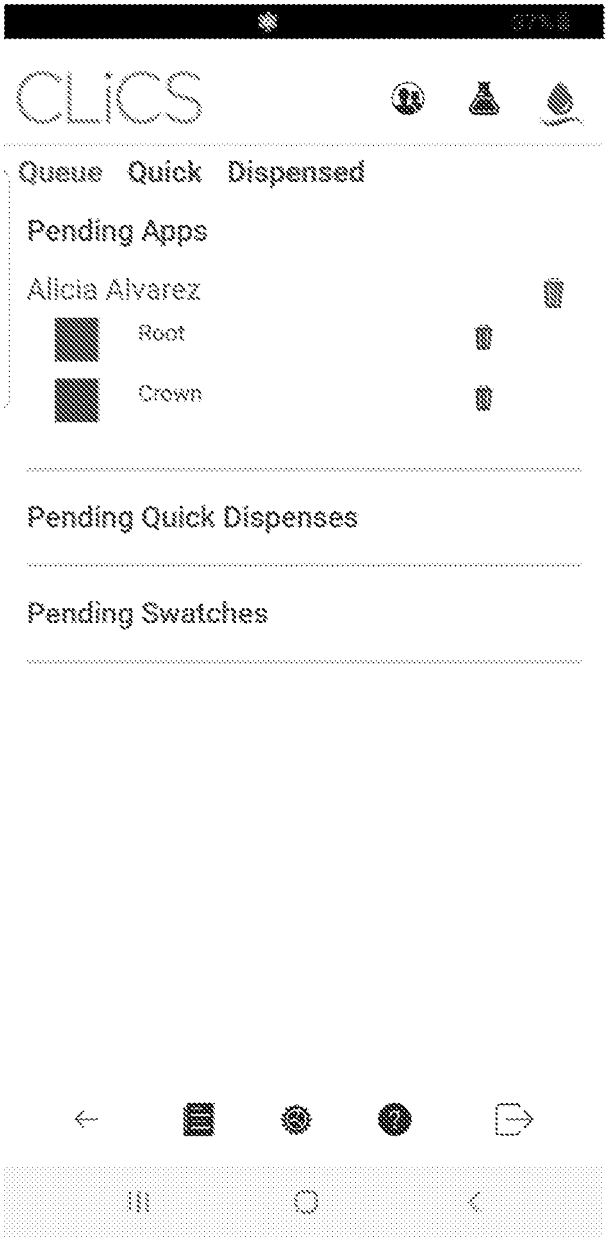
Figure 19:
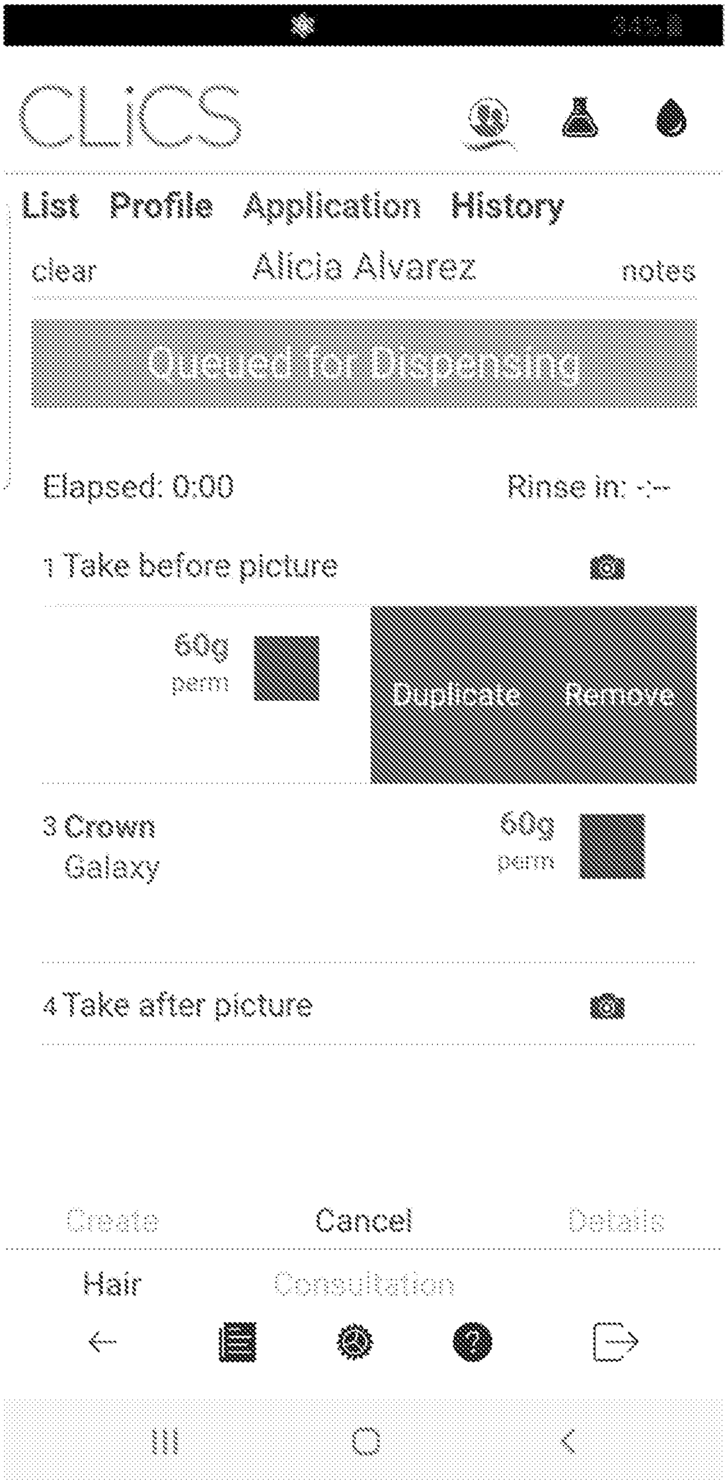

FIGS. 17-19 show screenshots of screens for tracking dispensing of the color application for the client. Once the client application is completed as shown through FIG. 16, the client or stylist may select the "Dispense" command to transmit the formulas for the color application to the apparatus 100, where the stylist or an assistant initiates the process of outputting the chemicals that are identified in the color application dye formula via a touch screen on the apparatus 100 (for example, via the panel 106. In some embodiments, the chemicals for the color application dye formula are dispensed automatically into the receptacle 154 automatically or when the receptacle 154 is detected. The client application workspace transitions from the application creation process to the application service process, during which the color application is dispensed and applied to the client's hair. At this point in the process, additional items are shown on the screen, including an elapsed timer, a rinse timer, and the option/ability to take before and after client pictures. Each step in the color application process is also numbered to provide a clear sense of the appropriate sequence of the steps to achieve the target hair color. FIG. 18 shows that, once the "Dispense" command is executed or selected, the dispenser tool shows the queued formulas under the name of the client along with the location of the hair that has been chosen, if any, and an image of the formula's color with the option to remove the formula(s) (for example, via selecting the trash can icon). At FIG. 19, the screen shows queued for dispensing or service in process states. The stylist can duplicate and/or remove a step using this screen.

Figure 20:
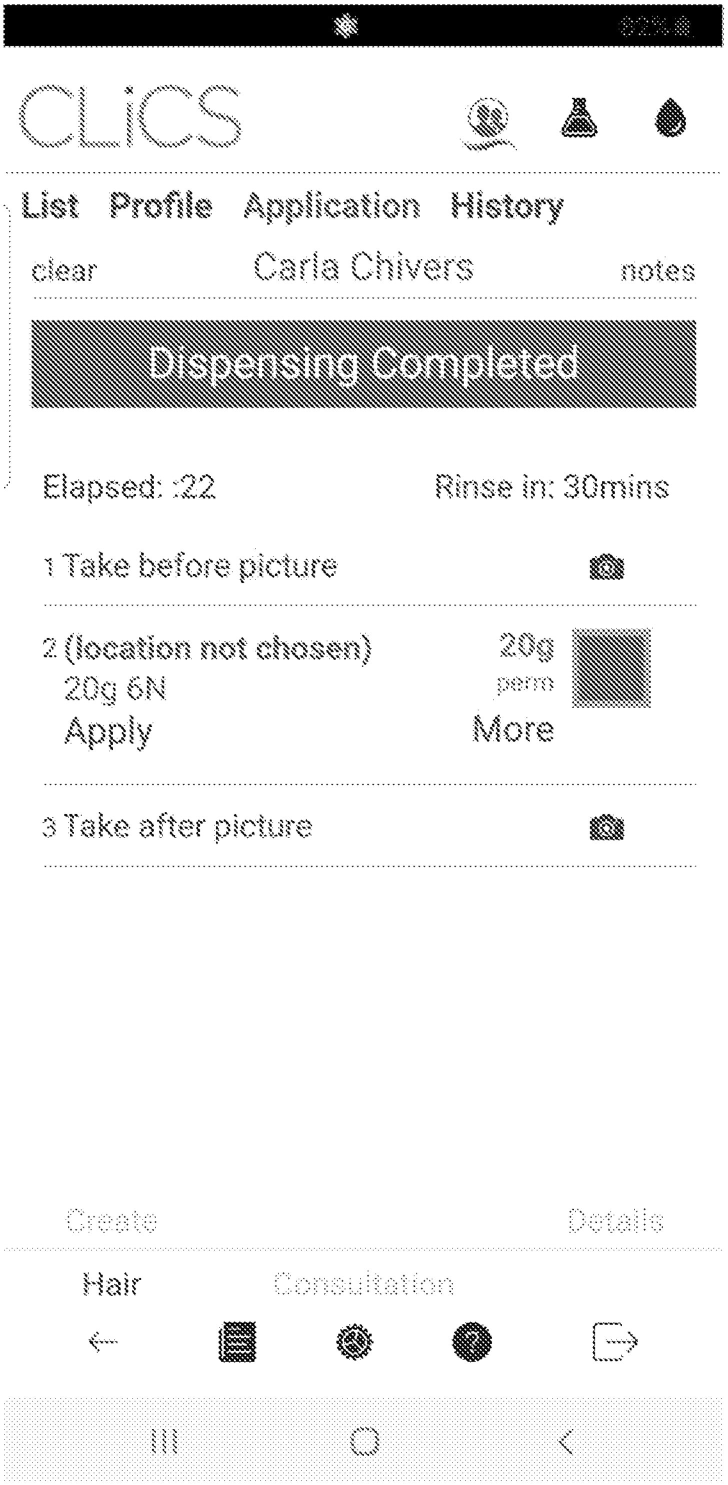
FIGS. 20-24 show screen shots of screens for tracking application of dispensed colors to the client's hair and associated application and/or rinse timers.
Figure 21:
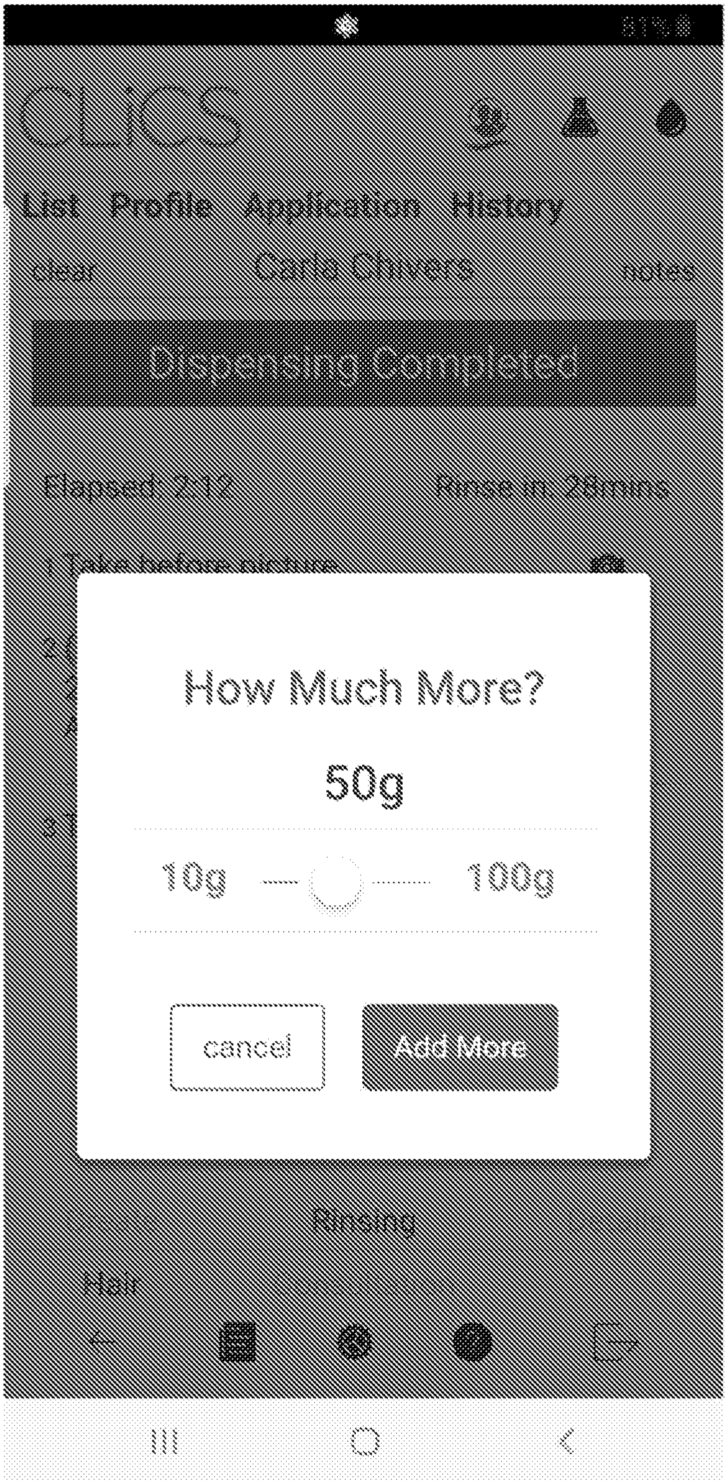
Figure 22:
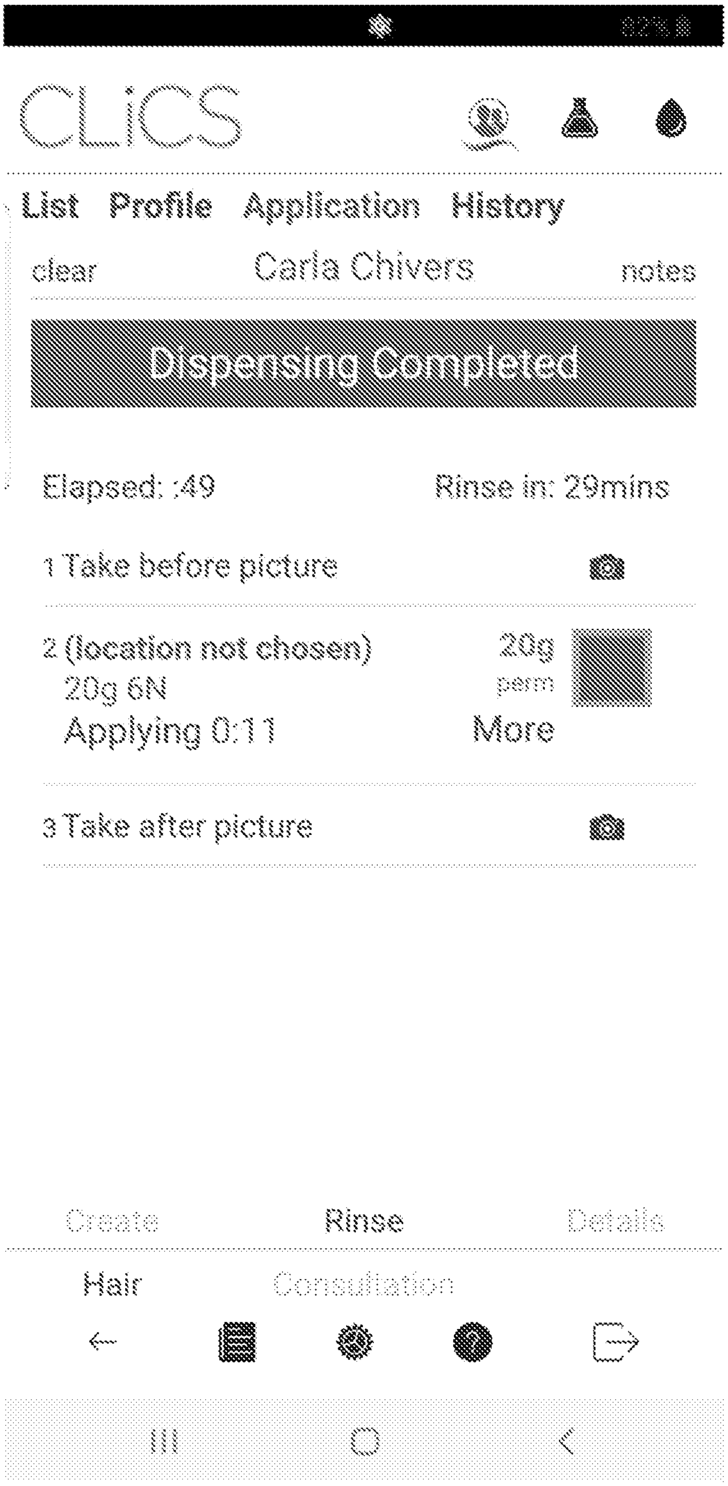
Figure 23:
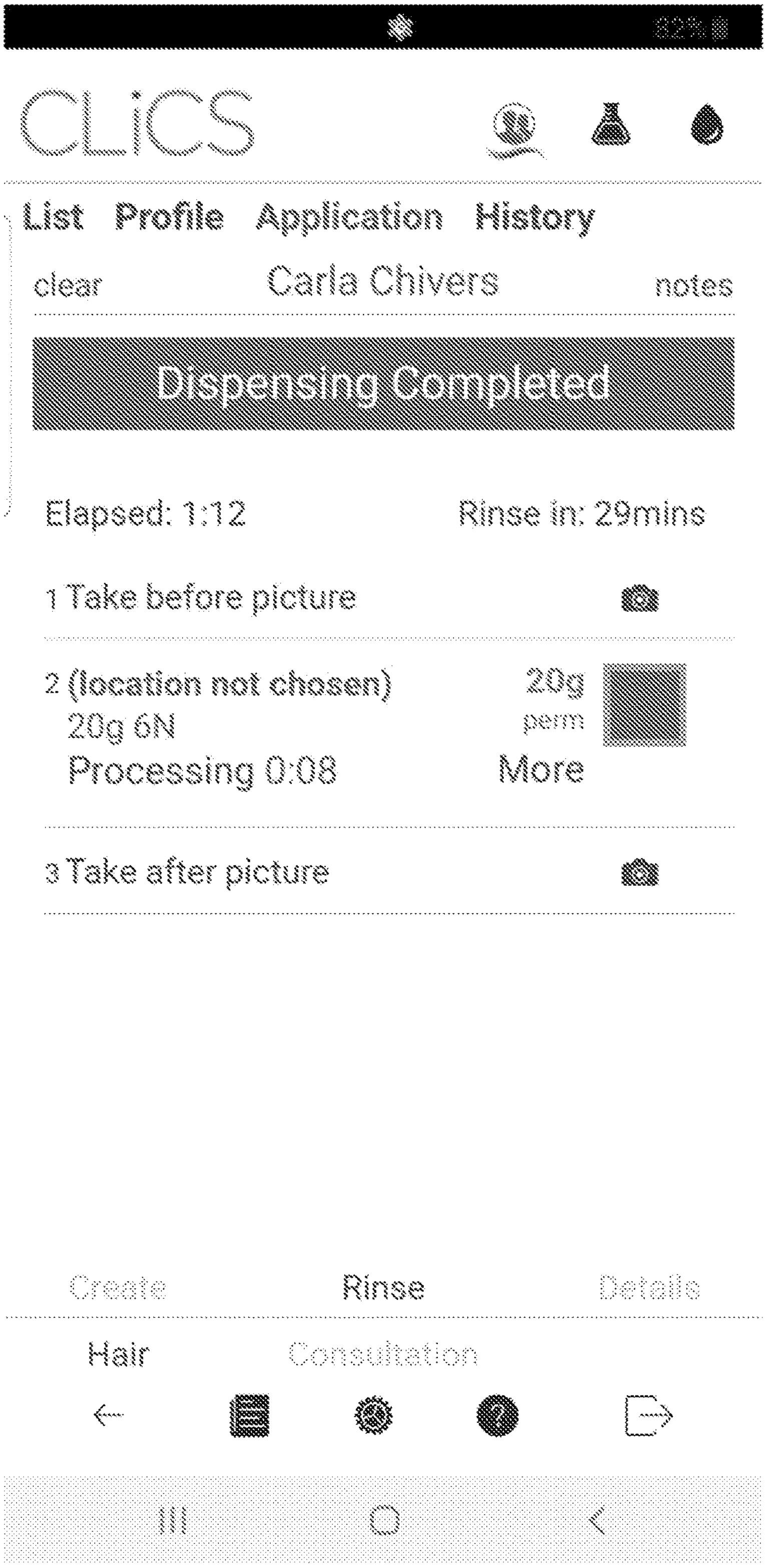
Figure 24:
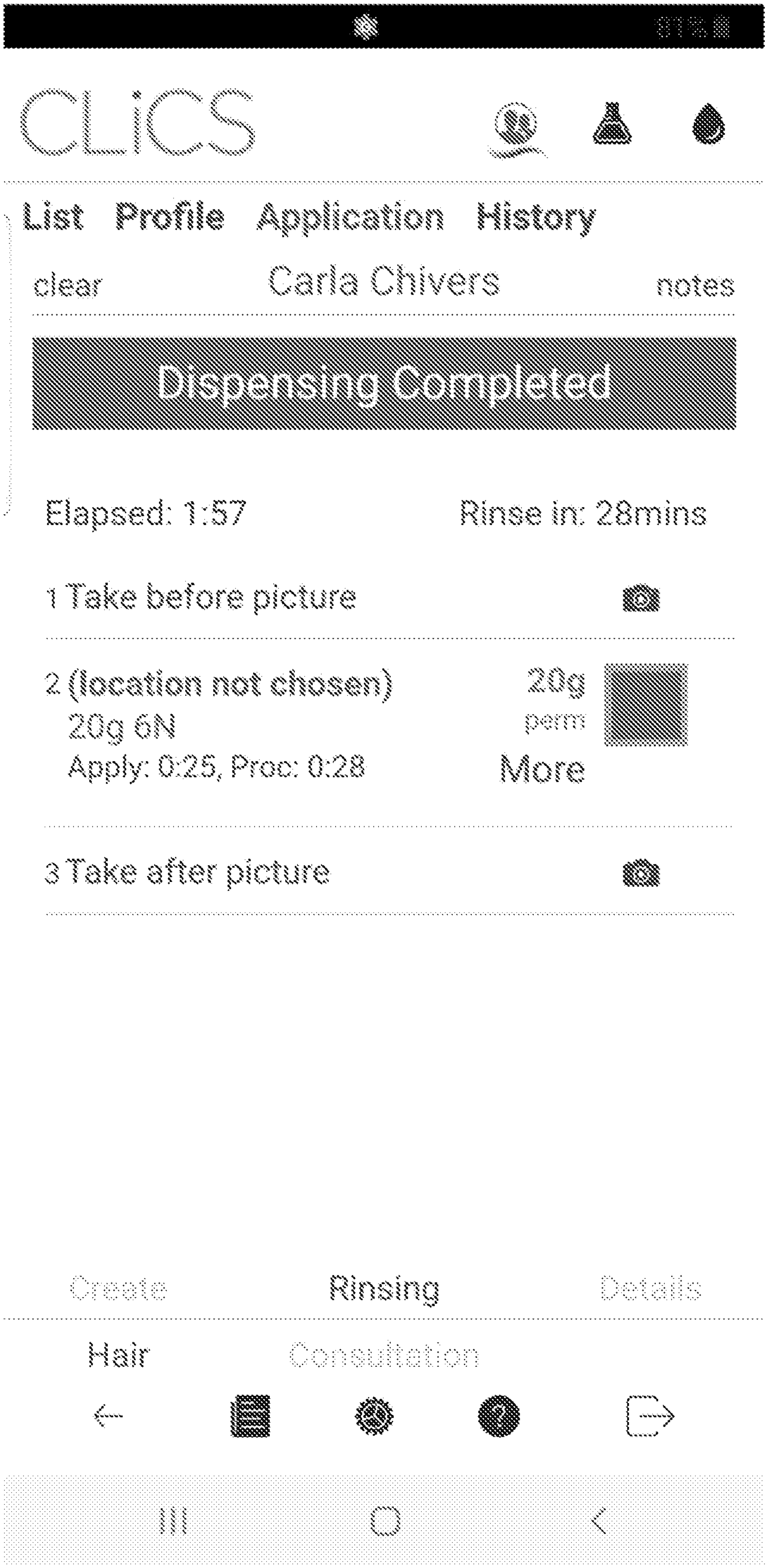

FIGS. 20-24 show screen shots of screens for tracking application of dispensed colors to the client's hair and associated application and/or rinse timers. FIG. 20 shows that once the formula for any of the steps associated with a client application has been dispensed, an elapsed timer and a rinse timers begin counting up and down, respectively. The step for a currently dispensed formula now shows an "Apply" command that, when initiated, counts the number of seconds while the stylist applies the currently dispensed formula to the client's hair according to the application. As shown in FIG. 21, a "More" command may appear or be requested to enable the stylist to dispense more of the same formula if needed to complete application to the target area defined for the currently dispensed formula. If "More" is selected, an additional amount of dye is dispensed by the apparatus 100 after being added to the apparatus 100 queue and added to the client application service screen. In some embodiments, a colored square is shown around the color image depicting the color of the formula that has been dispensed and which shows a color (for example, the color of the square) of the receptacle 154 that contains the formula for that step. In some embodiment, the receptacle 154 color information is supplied to the application using one or more sensors located in the apparatus 100. A "Rinse" command appears that, when executed, stops all timers including elapsed, rinse, apply and processing timers for all steps. FIG. 22 shows that one the "Apply" command from FIG. 20 is selected, the term "Applying" appears on the screen and a timer begins counting upward by the second. FIG. 23 shows that, once the color has been completely applied to the target area of the hair, the stylist or assistant or client can select the "Applying" command, which stops the "Apply" timer, and begins a processing timer. An amount of time that the color is on the client's hair after the application step correlates directly to the resulting tone. The apparatus may compute the amount of time the color should process on the client's hair to achieve the target tone result. FIG. 24 shows that, when the stylist selects the "Rinse" command, all timers are stopped, and the screen displays the total applying and processing times for a client application. This information is retained in the system and made available to the stylist and/or other operators of the apparatus 100 who can use the information to improve a stylist's skills and results for the client.

Figure 25:
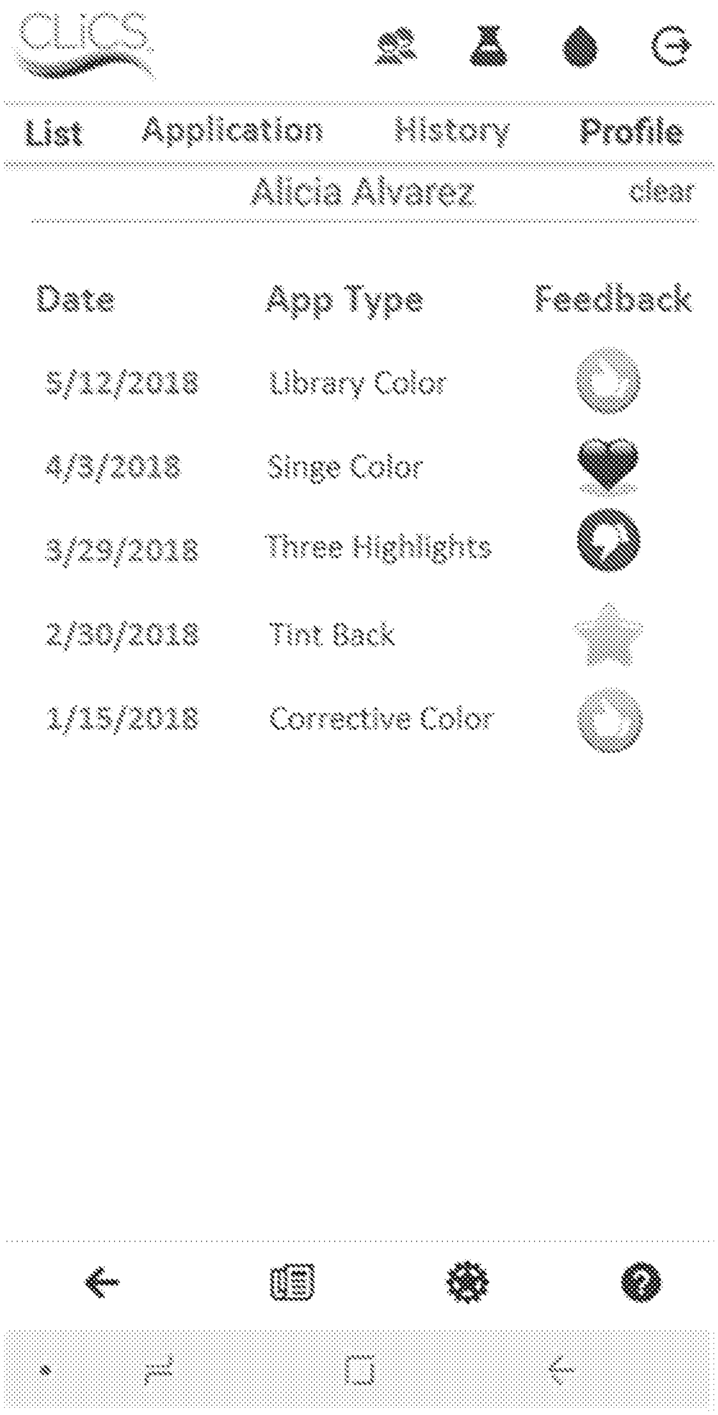
FIG. 25 shows a screen shot of a screen for client history of applications, etc., to the client's hair.

FIG. 25 shows a screen shot of a screen for client history of applications, etc., to the client's hair. At the point of completion of the color application service, a record of the service is recorded into the client history for the client, including the date, the type of application service and a service quality rating. In some embodiments, the application may generate an email, text message, or other notification for transmission to the client providing an opportunity to give feedback about the stylist, management, the color process, the salon, and so forth, which may populate a service rating for each of the above. In some embodiments, the stylist can select the application in the client history and execute the "Use" command to use that application for the same or different client.

Figure 26:
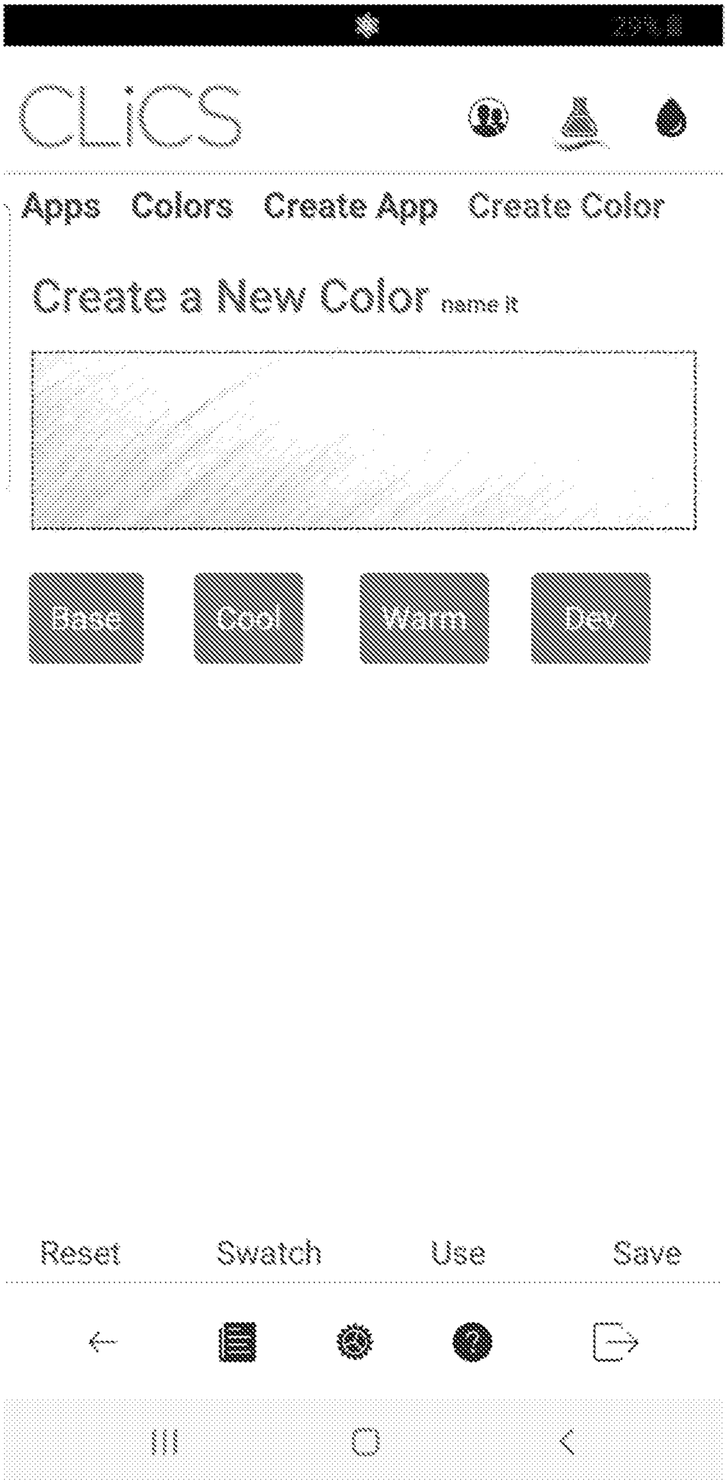
FIGS. 26-28 show screen shots of screens for creating a new color for application to the client's hair.
Figure 27:
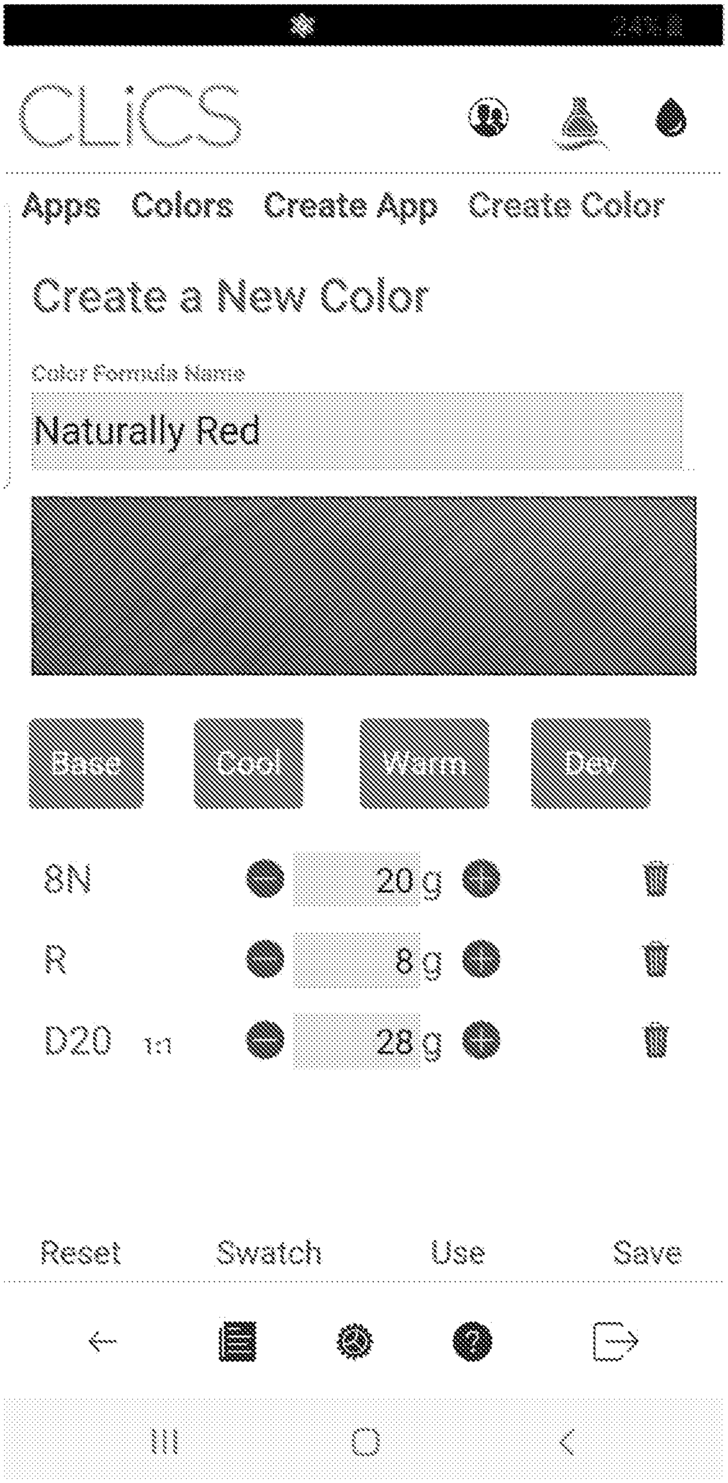
Figure 28:
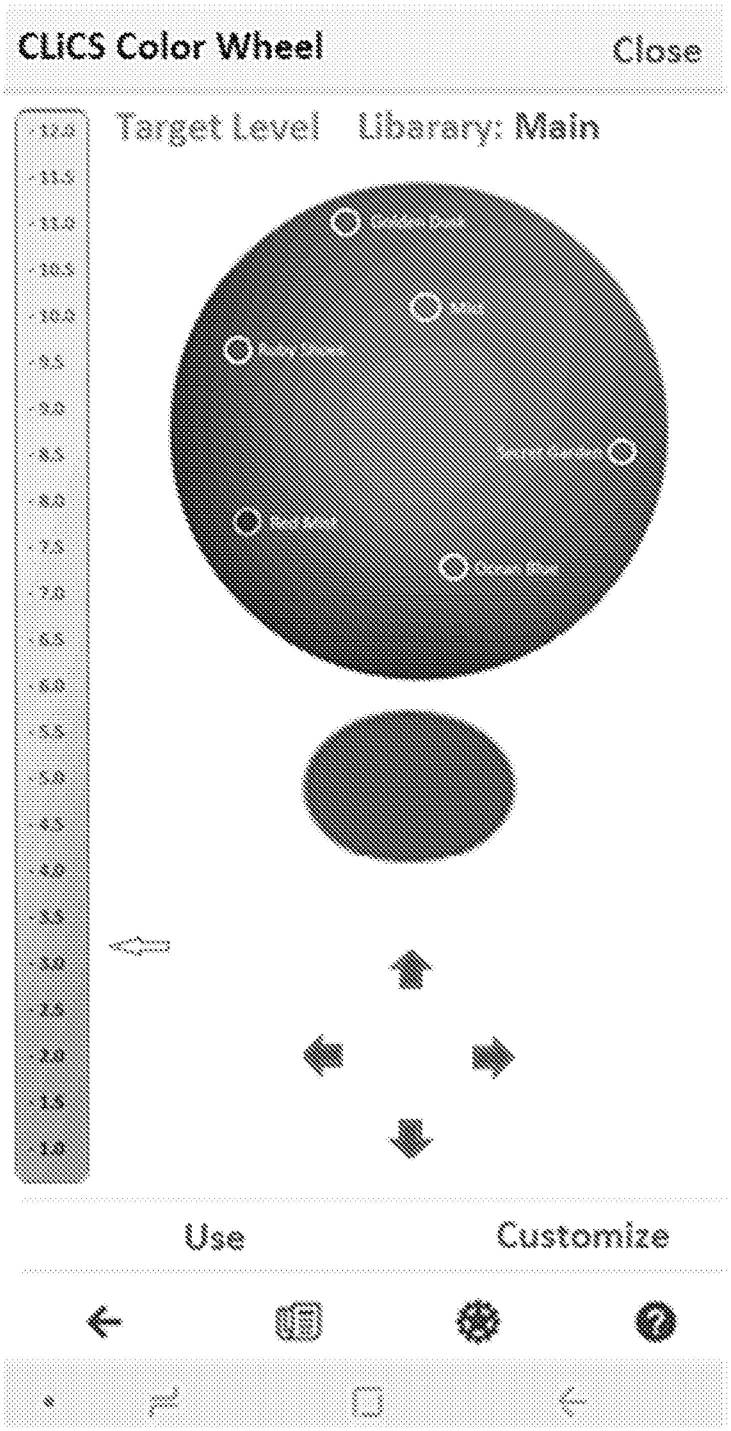

FIGS. 26-28 show screen shots of screens for creating a new color for application to the clients hair. As shown in FIG. 26, when the stylist selects the "Create" command as described above during the client application creation process, the stylist can further select the "Create Color" option. Such selection may display the "Create Color" screen of FIG. 26, which is part of the laboratory tool introduced above. The "Create Color" tool is a unique and powerful capability that allows the stylist and/or client or other operator to create tones using formula components from one or more hair color brands or lines and immediately see what the resulting tone will produce. In some embodiments, the resulting tone can be displayed to the client to show what the hair tone will look like on the client (for example, superimposed on the client's hair). In some embodiments, as the stylist adds specific formula components to the created formula or adjusts their amounts, the one or more algorithms computes the resulting tone, which is displayed for the Stylist. The formula can then be sent to the apparatus 100 using the "Swatch" command, copied into a client's application workspace with the "Use" command, or retained in a named library with the "Save" command. In some embodiments, the "Create Color" tool provides the stylist with an ability to see the results of a selected set of mixable lines of hair color in a particular combination as applied to the client's hair. In some embodiments, the "Create Color" tool provides a capability to present the stylist with a set of hair colors that can be chosen from the color space using a color wheel, as shown in FIG. 28. The screen of FIG. 28 shows allows the stylist or client to select a lightness level which represents a range of lightness as defined by the L value in the CIE LAB color space, and then taps somewhere is the color wheel to select a hair color level. A set of navigation arrows may provide the stylist and/or client an ability to perform fine navigation through the color space of the color wheel.

Figure 29:
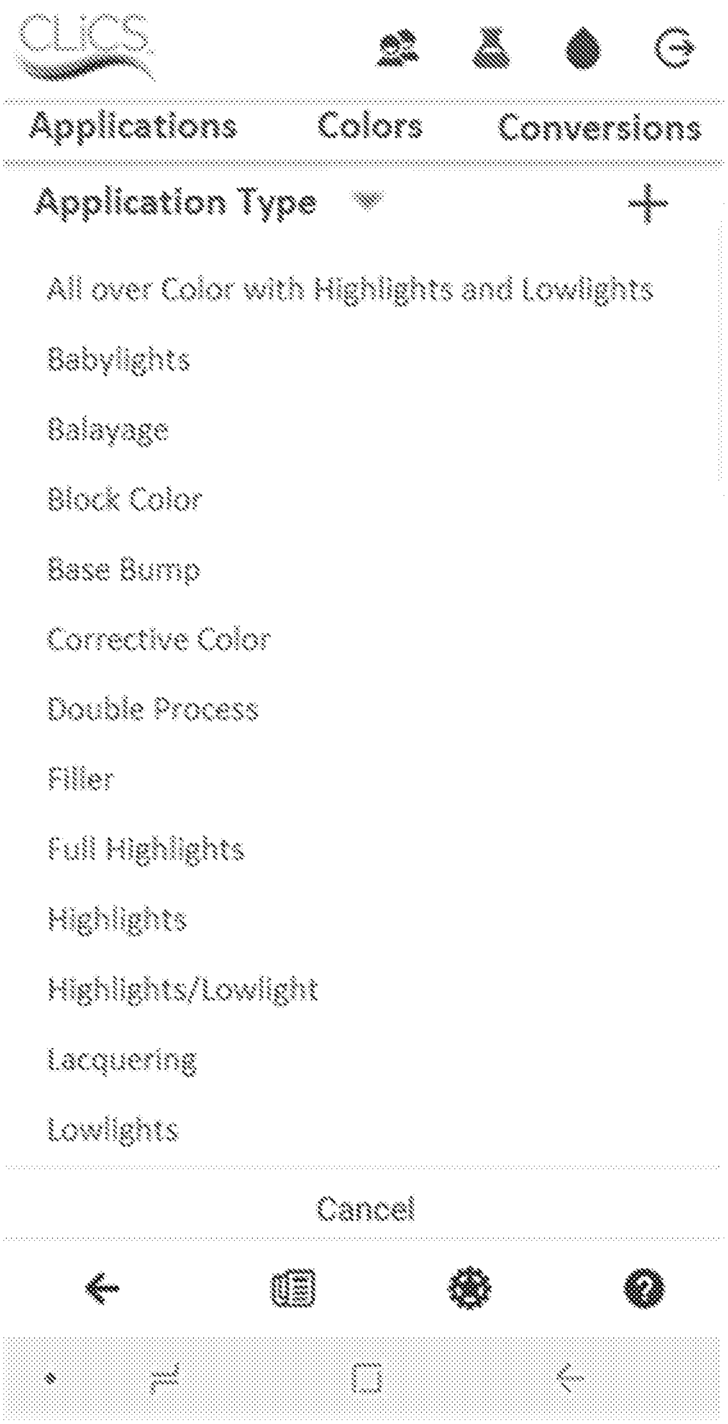
FIG. 29 shows a screen through which a color application can be selected for a client.

FIG. 29 shows a screen through which a color application can be selected for a client. As described above, the application described herein includes enables client color applications to be organized into ordered steps. In some embodiments, the application includes a library of predefined client application types. In some embodiments, each color application is unique from all other color applications according to the number of steps, the location on the hair where each step is applied, and the unique configuration of each of the steps. During the client application "Create" process, the stylist may select from a predefined library of applications.

Figure 30:
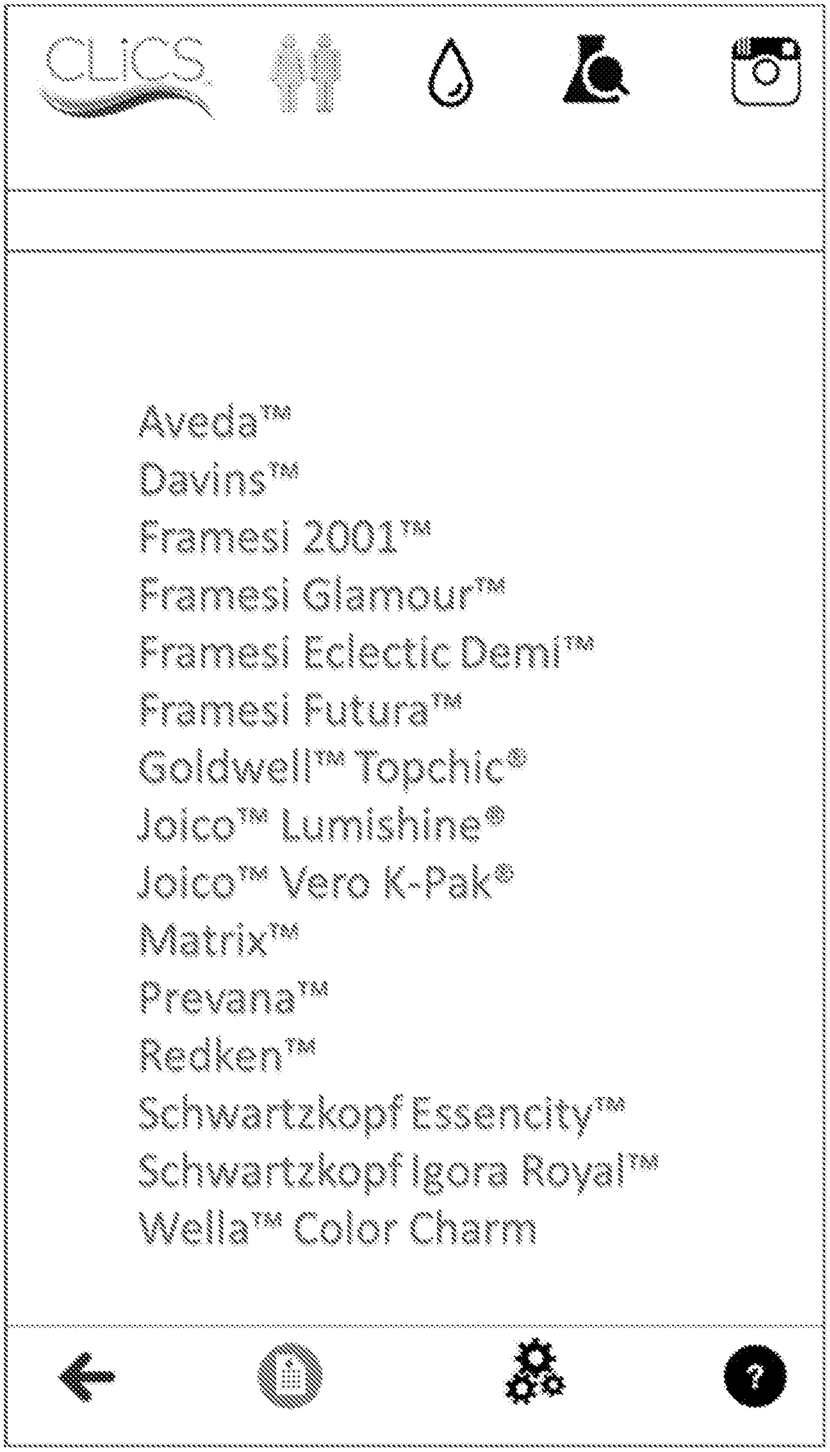
FIGS. 30-32 show screens of color conversion tools available.
Figure 31:
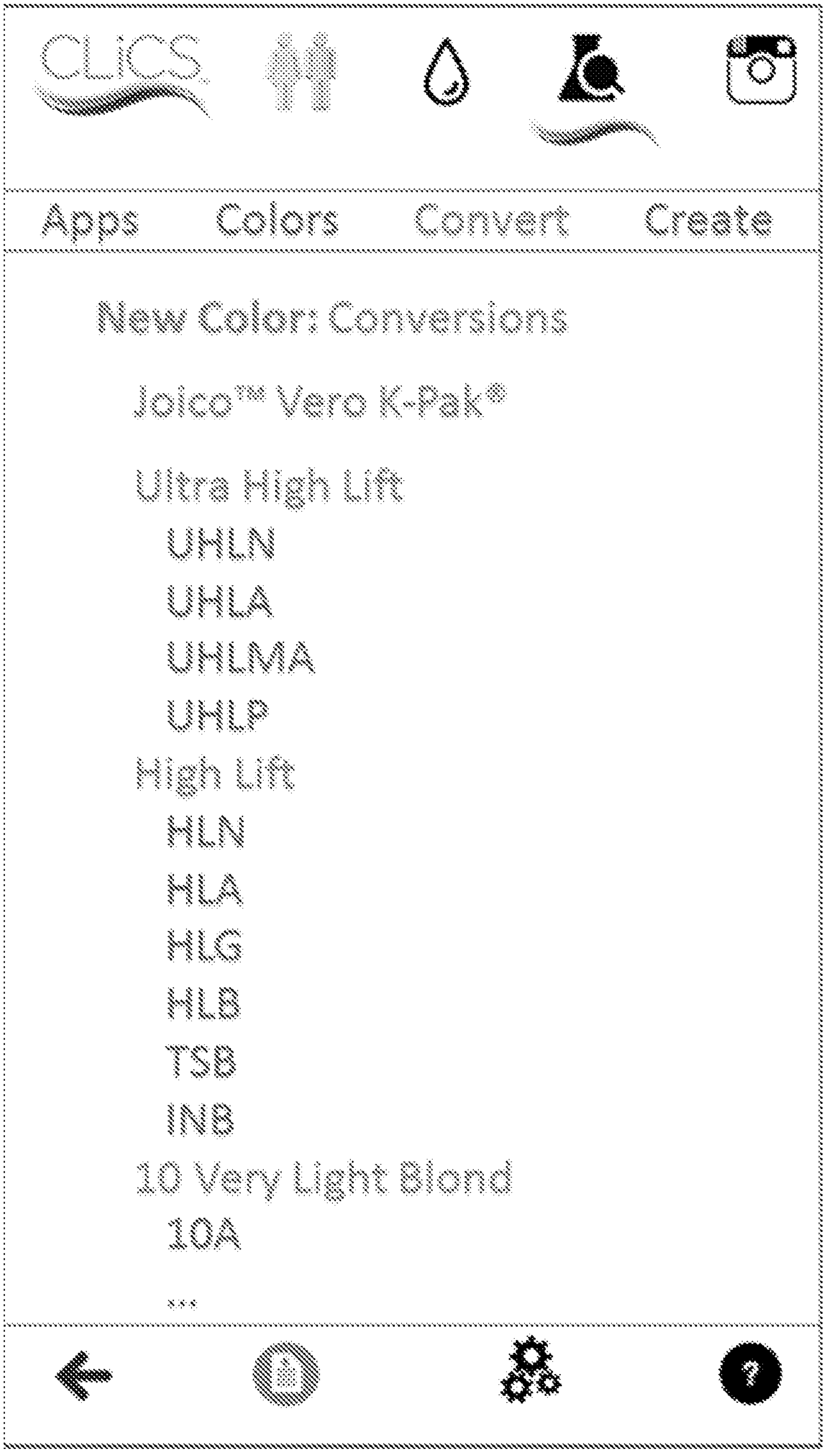
Figure 32:
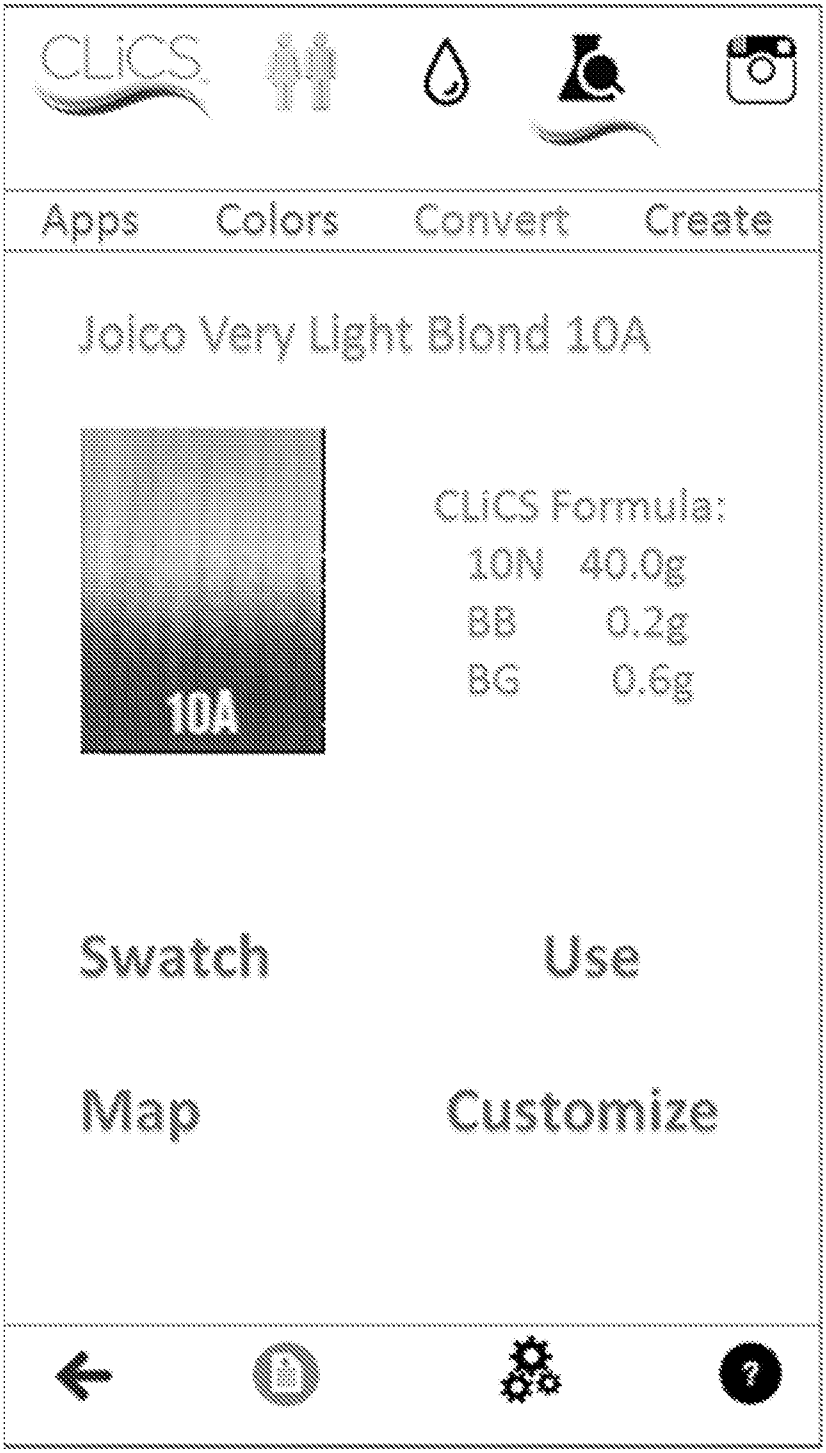

In some embodiments, an option is provided to the stylist from the "Create" command to edit an existing color application, which allows the stylist to customize the color application type. If the color application is unique in its configuration, the stylist can name the type of application they have designed. The application also gives the stylists an ability to publish colors and applications that they design on a social media platform. In addition to the capabilities above, the lab tool includes the ability to use "Convert" command to see a list of hair color suppliers and the named line of hair color tones they offer. The stylist has the option to select from a list of suppliers, as shown in FIG. 30, which shows a screen of color conversion tools available. This may allow a color from one brand or line to be converted to a similar color in another brand or line. FIG. 31 shows a screen that allows the Stylist to access a menu of color options and select a particular tone. The stylist can then select a particular item and see on FIG. 32 the tone and the formula that replicates the selected tone using another brand's colors as the formula components. The stylist can then select from one of four commands including the "Use" command to use the tone in a client's application, the "Swatch" command to output the formula to the apparatus 100 where the formula can be applied to ISO cloth or hair to see the actual color, the "Map" commend to see the tone in the color wheel, or the "Customize" command, which pulls the formula into the create color tool in the lab.

Various benefits are provided by the application described herein, including enabling storage, retention and retrieval of the hair profile, consultation, application service process, formulas and resulting images for one or more clients, real-time hair color tone design and customization, visualization of the color space and selection from within the color space. The application provides an automated step-by-step client application service tool, automated application control of a computerized dispenser for fine dispensing control, and libraries of colors that can be populated with formulas designed by a Stylist, or pulled from preexisting libraries that may include contributions from other stylists. The application also provides libraries of application types with help and training information to improve a stylist's skills, the ability to select from a broad range of tones offered by other hair color suppliers and replicate them using other brands' colors, the ability to for stylists and managers to recall records that can be used for quality control and training purposes, the ability to recall formulas and applications out of a client history record, the ability to accurately reproduce a formula, tone, and application to provide consistent results for clients, the ability for the application to assist the stylist by recommending courses of action or identifying Steps that may create results other than what the stylist is attempting to achieve, and the ability to design a client application from a remote location prior to the application service process and transmit the formulas to the apparatus 100 subsequent dispensing. The application also provides the ability to name colors that have been designed, the ability to share designed colors and applications with other stylists or clients on social media, and the ability to dispense swatch amounts to test on ISO cloth and hair, to record those results using sensor technology and to retain that information for subsequent use.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention. Furthermore, those of ordinary skill in the art will appreciate that the foregoing description is by way of example only, and is not intended to limit the invention. Thus, it is intended that the present subject matter covers such modifications and variations.

ADDITIONAL EMBODIMENTS

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid-state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To illustrate clearly this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, “can,” “could,” “might,” or “may,” unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein a “data storage system” may be embodied in computing system that utilizes hard disk drives, solid-state memories and/or any other type of non-transitory computer-readable storage medium accessible to or by a device such as an access device, server, or other computing device described. A data storage system may also or alternatively be distributed or partitioned across multiple local and/or remote storage devices as is known in the art without departing from the scope of the present disclosure. In yet other embodiments, a data storage system may include or be embodied in a data storage web service.

As used herein, the terms “determine” or “determining” encompass a wide variety of actions. For example, “determining” may include calculating, computing, processing, deriving, looking up (for example, looking up in a table, a database or another data structure), ascertaining and the like. Also, “determining” may include receiving (for example, receiving information), accessing (for example, accessing data in a memory) and the like. Also, “determining” may include resolving, selecting, choosing, establishing, and the like.

As used herein, the term “selectively” or “selective” may encompass a wide variety of actions. For example, a “selective” process may include determining one option from multiple options. A “selective” process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms “provide” or “providing” encompass a wide variety of actions. For example, “providing” may include storing a value in a location for subsequent retrieval, transmitting a value directly to the recipient, transmitting or storing a reference to a value, and the like. “Providing” may also include encoding, decoding, encrypting, decrypting, validating, verifying, and the like.

As used herein, the term “message” encompasses a wide variety of formats for communicating (for example, transmitting or receiving) information. A message may include a machine-readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a “user interface” (also referred to as an interactive user interface, a graphical user interface or a UI) may refer to a network-based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (for example, send or receive data) in accordance with one or more of the aspects described.

Disjunctive language such as the phrase “at least one of X, Y, or Z,” unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general-purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. A system comprising:

a scanning device for measuring a color of a client's hair;

a database comprising hair color measurements taken from a plurality of prior clients;

a neural network trained on the hair color measurements to identify coloring protocols which will change the color of the client's hair to a target color, wherein the coloring protocols comprise one or more steps for changing the color of the client's hair to the target color; and a hair dye dispensing system comprising:

a first input for reading the measured color from the scanning device;

a processor configured to apply the measured color to the neural network to calculate a desired target hair color and develop a coloring protocol for changing the client's hair color to the desired target color; and a dispenser for dispensing one or more formulations that follow the coloring protocol.

2. The system of claim 1, wherein the scanning device comprises one or more of a colorimeter, a spectral analyzer, a camera, a video camera, a digital imaging device, an image scanner, a frequency information capturing device, or an optical scanner.

3. The system of claim 1, further comprising a memory circuit configured to store a library of lightness values that includes measurement values for each hair color generated by the one or more formulations dispensed by the dispenser.

4. The system of claim 3, wherein the library comprises a lookup table comprising a maximum lightness value and a minimum lightness value for each hair color generated by the one or more formulations dispensed by the dispenser.

5. The system of claim 4, wherein measuring the color of the client's hair comprises measuring a lightness of the client's hair and reading the measured color from the scanning device comprises reading the measured lightness.

6. The system of claim 1, wherein the database further comprises one or more characteristics of the plurality of prior clients' hair and wherein:

the scanning device is further configured to measure one or more characteristics of the client's hair, wherein the first input is further for reading the one or more characteristics from the scanning device; and the processor is configured to develop the coloring protocol based on a comparison of the measured one or more characteristics from the scanning device and the one or more characteristics of the plurality of prior clients' hair.

7. The system of claim 6, wherein the one or more characteristics comprise one or more of a hair health, hair color, hair type, hair density, hair thickness, hair porosity, hair moisture level, hair damage, previous formulations applied to the hair, or percentage of gray of the hair.

8. The system of claim 6, wherein:

the hair dye dispensing system further comprises a second input for receiving one or more measurements of the client's final hair color, and the processor is further configured to store the received one or more measurements of the client's final hair color in the database.

9. The system of claim 6, wherein:

the hair dye dispensing system further comprises a second input for receiving one or more measurements of the client's final hair color, and the processor is further configured to update the database based on the received one or more measurements of the client's final hair color.

10. The system of claim 9, wherein the processor is further configured to develop future coloring protocols based at least in part on the update to the database.

11. The system of claim 10, wherein developing the future coloring protocols comprises improving the future coloring protocols as compared to the coloring protocol to compensate for the one or more of the characteristics of the client's hair.

12. The system of claim 11, wherein compensating for the one or more characteristics of the client's hair comprises applying a model to determine how to develop the future coloring protocols to compensate for the one or more of the characteristics of the client's hair in view of the desired target hair color.

13. The system of claim 6, wherein the hair dye dispensing system further comprises a network interface configured to enable communications with one or more of the database or another hair dye dispensing system.

14. The system of claim 13, wherein the hair dye dispensing system is disposed in a first salon and the other hair dye dispensing system is disposed in a second salon different and remote from the first salon, wherein the hair dye dispensing system accesses client profiles for clients different from those of client profiles accessed by the other hair dye dispensing system.

15. The system of claim 6, wherein the processor is further configured to:

generate a client profile for the client, wherein the client profile comprises the measured color, the one or more characteristics from the scanning device, the desired target hair color, one or more measurements of the client's final hair color, and an identifier for the client, and store the client profile in the database.

16. The system of claim 1, wherein the neural network analyzes the prior client data and identifies corresponding measurements and characteristics from the database.

17. The system of claim 1, wherein the neural network computes the most probable results of a coloring session using the measurements received from the scanning device as applied to the client's hair.

18. The system of claim 1, wherein the neural network generates outputs of how to modulate and/or adjust a dye formulation to achieve the target color.

19. The system of any one of claim 1, wherein the coloring protocol includes a series of color applications steps, and wherein the database is mined at each step of the coloring protocol for data which may be used to improve the next step of the protocol.

20. The system of claim 1, wherein the neural network is configured to learn how to make formula adjustments which result in creating formulas that achieve the target color with a smaller number of applications than performed for the prior clients based on the data in the database.

21. The system of claim 1, wherein the neural network is configured to predict formula adjustments which result in creating formulas that improve the accuracy of a first-time application of a formula to a client's hair.

22. A system comprising:

a scanning device for measuring a color of a client's hair;

a trained neural network comprising hair data from a plurality of clients; and a hair dye dispensing system comprising:

an input for reading the measured color from the scanning device;

a processor configured to compare the measured color to a desired target color and develop a coloring protocol, using the trained neural network, to change the client's hair color to the desired target color, wherein the coloring protocol comprises one or more steps for changing the color of the client's hair to the target color; and a dispenser for dispensing one or more formulations that follow the coloring protocol.

23. The system of claim 22, wherein the hair data is comprised of measurements taken from prior treatments of a plurality of clients.

24. The system of claim 22, wherein the hair data is comprised of measurements taken from prior treatments of the client.

25. The system of claim 22, wherein the hair data comprises one or more of a hair health, hair color, hair type, hair density, hair thickness, hair porosity, hair moisture level, hair damage, previous formulations applied to the hair, or percentage of gray of the hair.

* * * * *